United States Patent
Goetz et al.

(10) Patent No.: US 11,687,951 B1
(45) Date of Patent: *Jun. 27, 2023

(54) TWO WAY SCREEN MIRRORING USING A SMART TABLE

(71) Applicant: Wells Fargo Bank, N.A., San Francisco, CA (US)

(72) Inventors: Darren Goetz, Salinas, CA (US); Dennis Montenegro, Concord, CA (US); Kourtney Eidam, Marietta, GA (US)

(73) Assignee: Wells Fargo Bank, N.A., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/872,998

(22) Filed: Jul. 25, 2022

Related U.S. Application Data

(63) Continuation of application No. 17/079,958, filed on Oct. 26, 2020, now Pat. No. 11,397,956.

(51) Int. Cl.
G06Q 30/02 (2023.01)
G06F 3/0481 (2022.01)
G06F 3/04883 (2022.01)
G06Q 30/04 (2012.01)

(52) U.S. Cl.
CPC ........... *G06Q 30/02* (2013.01); *G06F 3/0481* (2013.01); *G06F 3/04883* (2013.01); *G06Q 30/04* (2013.01)

(58) Field of Classification Search
CPC ...... G06Q 30/02; G06Q 30/04; G06F 3/0481; G06F 3/04883
See application file for complete search history.

(56) References Cited

U.S. PATENT DOCUMENTS

| | | |
|---|---|---|
| 6,430,542 B1 | 8/2002 | Moran |
| 6,493,469 B1 | 12/2002 | Taylor et al. |
| 6,667,738 B2 | 12/2003 | Murphy |
| 6,866,388 B2 | 3/2005 | Yang |
| 7,027,040 B2 | 4/2006 | Rekimoto et al. |
| 7,403,191 B2 | 7/2008 | Sinclair |

(Continued)

FOREIGN PATENT DOCUMENTS

| | | |
|---|---|---|
| CN | 107977776 | 5/2018 |
| CN | 108198076 | 6/2018 |

(Continued)

OTHER PUBLICATIONS

Cho et al.; Interaction for Tabletop Computing Environment an Analysis and Implementation 8 Pages.

(Continued)

*Primary Examiner* — Seth A Silverman
(74) *Attorney, Agent, or Firm* — Foley & Lardner LLP

(57) ABSTRACT

A system includes a tabletop touchscreen display and a processing circuit comprising a processor coupled to non-transitory memory, wherein the processing circuit is configured to pair with a customer device associated with a customer, cause an image comprising sensitive customer information to be displayed on the tabletop display and cause at least a portion of the sensitive customer information to be simultaneously displayed on the paired customer device, receive a security trigger event indicative of a third party being proximate the smart table, and cause the sensitive customer information to be obscured on the tabletop display based on receiving the security trigger event.

15 Claims, 13 Drawing Sheets

(56) References Cited

U.S. PATENT DOCUMENTS

| | | |
|---|---|---|
| 8,194,045 B1 | 6/2012 | Maloney et al. |
| 8,195,576 B1 | 6/2012 | Grigg et al. |
| 8,206,047 B1 | 6/2012 | Isaac et al. |
| 8,207,872 B2 | 6/2012 | Huang et al. |
| 8,346,672 B1 | 1/2013 | Weiner et al. |
| 8,356,712 B2 | 1/2013 | Piazza, Jr. |
| 8,438,110 B2 | 5/2013 | Calman et al. |
| 8,451,248 B1 | 5/2013 | Kim |
| 8,502,789 B2 | 8/2013 | Tse et al. |
| 8,549,589 B2 | 10/2013 | Stollman |
| 8,700,772 B2 | 4/2014 | Saint Clair |
| 8,743,072 B2 | 6/2014 | Kim |
| 8,854,330 B1 | 10/2014 | Maloney et al. |
| 9,024,884 B2 | 5/2015 | Lengeling et al. |
| 9,075,429 B1 | 7/2015 | Karakotsios |
| 9,104,886 B1 | 8/2015 | Dolbakian et al. |
| 9,141,280 B2 | 9/2015 | Van Eerd et al. |
| 9,292,129 B2 | 3/2016 | Tsang et al. |
| 9,411,467 B2 | 8/2016 | Argiro |
| 9,430,140 B2 | 8/2016 | Reuschel et al. |
| 9,529,514 B2 | 12/2016 | Saint Clair |
| 9,560,076 B2 | 1/2017 | Schultz et al. |
| 9,576,105 B2 | 2/2017 | Cho |
| 9,588,680 B2 | 3/2017 | Van Eerd et al. |
| 9,590,968 B2 | 3/2017 | Stollman |
| 9,665,259 B2 | 5/2017 | Lee et al. |
| 9,715,476 B2 | 7/2017 | Megiddo et al. |
| 9,746,981 B2 | 8/2017 | Zachut et al. |
| 9,747,499 B2 | 8/2017 | Kim et al. |
| 9,749,395 B2 | 8/2017 | Dawson et al. |
| 9,769,216 B2 | 9/2017 | Gaetano, Jr. |
| 9,774,653 B2 | 9/2017 | Hinckley et al. |
| 9,794,306 B2 | 10/2017 | Riecken et al. |
| 9,883,138 B2 | 1/2018 | Chen et al. |
| 9,898,663 B2 | 2/2018 | Wexler et al. |
| 9,924,019 B2 | 3/2018 | Jeganathan et al. |
| 9,953,479 B1 | 4/2018 | Sawant et al. |
| 9,990,814 B1 | 6/2018 | Eidam et al. |
| 10,055,046 B2 | 8/2018 | Lengeling et al. |
| 10,096,011 B2 | 10/2018 | Camp |
| 10,230,844 B1 | 3/2019 | Ellis et al. |
| 10,262,509 B1 | 4/2019 | Kourtney et al. |
| 10,332,200 B1 | 6/2019 | Fournier et al. |
| 10,367,912 B2 | 7/2019 | Saint Clair |
| 10,484,437 B2 | 11/2019 | Banyai et al. |
| 10,485,341 B2 | 11/2019 | Dash et al. |
| 10,540,014 B2 | 1/2020 | Gribetz et al. |
| 10,565,643 B2 | 2/2020 | Rohn et al. |
| 10,567,481 B2 | 2/2020 | Dawson et al. |
| 10,579,228 B2 | 3/2020 | Vida et al. |
| 10,614,219 B2 | 4/2020 | Knapp et al. |
| 10,735,709 B2 | 8/2020 | Moss et al. |
| 10,891,688 B1 | 1/2021 | Clausen et al. |
| 10,970,549 B1 | 4/2021 | Krishnan et al. |
| 11,195,355 B1 | 12/2021 | Goetz et al. |
| 2001/0037287 A1 | 11/2001 | Broadbent et al. |
| 2002/0070964 A1 | 6/2002 | Botz et al. |
| 2003/0069828 A1 | 4/2003 | Blazey et al. |
| 2003/0108241 A1 | 6/2003 | Colmenarez et al. |
| 2004/0075642 A1 | 4/2004 | Kisliakov |
| 2004/0233216 A1 | 11/2004 | Rekimoto et al. |
| 2005/0178074 A1 | 8/2005 | Kerosetz |
| 2005/0185825 A1 | 8/2005 | Hoshino et al. |
| 2005/0269404 A1 | 12/2005 | Landwirth et al. |
| 2005/0289045 A1 | 12/2005 | Lawson |
| 2006/0101508 A1 | 5/2006 | Taylor |
| 2007/0296545 A1 | 12/2007 | Clare |
| 2007/0296579 A1 | 12/2007 | Mayer et al. |
| 2007/0300307 A1 | 12/2007 | Duncan |
| 2009/0056599 A1 | 3/2009 | Turner et al. |
| 2009/0174673 A1 | 7/2009 | Ciesla |
| 2009/0315830 A1 | 12/2009 | Westerman |
| 2010/0062811 A1 | 3/2010 | Park et al. |
| 2010/0066667 A1 | 3/2010 | Macdougall et al. |
| 2010/0238119 A1 | 9/2010 | Dubrovsky et al. |
| 2010/0302168 A1 | 12/2010 | Giancarlo et al. |
| 2011/0035695 A1 | 2/2011 | Fawcett et al. |
| 2011/0256019 A1 | 10/2011 | Gruen et al. |
| 2011/0260976 A1 | 10/2011 | Larsen et al. |
| 2012/0032783 A1 | 2/2012 | Ahn et al. |
| 2012/0119999 A1 | 5/2012 | Harris |
| 2012/0204116 A1 | 8/2012 | Patil et al. |
| 2012/0204117 A1 | 8/2012 | Patil et al. |
| 2013/0249947 A1 | 9/2013 | Reitan |
| 2014/0012754 A1 | 1/2014 | Hanson et al. |
| 2014/0168107 A1 | 6/2014 | Kim |
| 2015/0020191 A1 | 1/2015 | Vida et al. |
| 2015/0059002 A1 | 2/2015 | Balram et al. |
| 2015/0109099 A1 | 4/2015 | Birkel et al. |
| 2015/0135101 A1 | 5/2015 | Ellis et al. |
| 2015/0221035 A1 | 8/2015 | Anderson et al. |
| 2015/0278534 A1 | 10/2015 | Thiyagarajan et al. |
| 2015/0279310 A1 | 10/2015 | Itakura et al. |
| 2016/0034901 A1 | 2/2016 | Ferren |
| 2016/0037346 A1 | 2/2016 | Boettcher et al. |
| 2016/0071224 A1 | 3/2016 | Huang |
| 2016/0180614 A1 | 6/2016 | Micali et al. |
| 2016/0191576 A1 | 6/2016 | Thompson et al. |
| 2017/0099453 A1 | 4/2017 | Junuzovic et al. |
| 2017/0103440 A1 | 4/2017 | Xing et al. |
| 2017/0115742 A1 | 4/2017 | Xing et al. |
| 2017/0118645 A1 | 4/2017 | Zarakas et al. |
| 2017/0169506 A1 | 6/2017 | Wishne et al. |
| 2017/0180336 A1 | 6/2017 | Josephson et al. |
| 2017/0227938 A1 | 8/2017 | Wexler et al. |
| 2017/0278358 A1 | 9/2017 | Ino et al. |
| 2017/0356218 A1 | 12/2017 | Beasley et al. |
| 2018/0041493 A1 | 2/2018 | Wilkinson et al. |
| 2018/0060812 A1 | 3/2018 | Robinson et al. |
| 2018/0089349 A1 | 3/2018 | Rezgui |
| 2018/0096386 A1 | 4/2018 | Aggarwal et al. |
| 2018/0101985 A1 | 4/2018 | Jones-Mcfadden et al. |
| 2018/0108207 A1 | 4/2018 | Lyons et al. |
| 2018/0122187 A1 | 5/2018 | Moore et al. |
| 2018/0247134 A1 | 8/2018 | Bulzacki et al. |
| 2018/0268747 A1 | 9/2018 | Braun |
| 2018/0293087 A1 | 10/2018 | Lee et al. |
| 2018/0301111 A1 | 10/2018 | Park et al. |
| 2018/0328099 A1 | 11/2018 | Whitaker et al. |
| 2018/0356885 A1 | 12/2018 | Ross et al. |
| 2018/0357850 A1 | 12/2018 | Moore et al. |
| 2019/0019011 A1 | 1/2019 | Ross et al. |
| 2019/0034895 A1 | 1/2019 | Camp |
| 2019/0108524 A1 | 4/2019 | Nicholson et al. |
| 2019/0114585 A1 | 4/2019 | Fee et al. |
| 2019/0121522 A1 | 4/2019 | Davis et al. |
| 2019/0228494 A1 | 7/2019 | Stasi et al. |
| 2019/0228609 A1 | 7/2019 | Nguyen et al. |
| 2019/0268321 A1 | 8/2019 | Kim et al. |
| 2019/0306709 A1 | 10/2019 | Kim et al. |
| 2019/0328339 A1 | 10/2019 | Gujral et al. |
| 2019/0360259 A1 | 11/2019 | Green et al. |
| 2020/0000341 A1 | 1/2020 | Messerschmidt et al. |
| 2020/0034106 A1 | 1/2020 | Jain et al. |
| 2020/0056418 A1 | 2/2020 | Dobbins et al. |
| 2020/0064960 A1 | 2/2020 | Munemoto |
| 2020/0066079 A1 | 2/2020 | Swaine et al. |
| 2020/0187694 A1 | 6/2020 | Santangeli et al. |
| 2020/0218493 A1 | 7/2020 | Sim et al. |
| 2020/0301720 A1 | 9/2020 | Choi |
| 2022/0255920 A1 | 8/2022 | Bester et al. |

FOREIGN PATENT DOCUMENTS

| | | |
|---|---|---|
| CN | 108255462 | 7/2018 |
| CN | 109471687 | 3/2019 |
| CN | 109983491 | 7/2019 |
| EP | 2 919 209 | 9/2015 |
| JP | 6555129 B2 | 8/2019 |
| KR | 2019002815 A | 1/2019 |

(56) References Cited

FOREIGN PATENT DOCUMENTS

| WO | WO-2019/019743 | 1/2019 |
| WO | WO-2019/098992 | 5/2019 |

OTHER PUBLICATIONS

Dani Deahl, This All-In-One Smart Desk Has Three Screens and a Built-In Scanner; Jun. 25, 2018. 2 Pages.
Scott Cary; How Capital One Taught Amazon's Alexa Ai Assistant To Help You Manage Your Money. Nov. 30, 2016; 4 Pages.
K. M. Everitt, et al. "DocuDesk: An interactive surface for creating and rehydrating many-to-many linkages among paper and digital documents," IEEE 2008, pp. 25-28, doi: 10.1109/TABLETOP.2008.4660179. (Year: 2008).

TWO WAY SCREEN MIRRORING USING A SMART TABLE

CROSS REFERENCE TO RELATED APPLICATIONS

This application is a continuation of U.S. patent application Ser. No. 17/079,958, filed Oct. 26, 2020, which is incorporated herein in its entirety by reference thereto.

TECHNICAL FIELD

This application relates generally to the use of a smart table to improve efficiency and ease of conducting transactions at a provider location associated with a provider. More specifically, this application relates to systems and methods for two way screen mirroring using a smart table.

BACKGROUND

Customers of a provider are able to access a variety of services through software applications, such as mobile applications on user devices, to perform various tasks. For example, customers may use an internet enabled application to conduct transactions, change settings, and carry out other actions related to a customer account or with respect to a product offered by the provider. However, certain transactions and tasks may require a customer to visit a provider location (e.g., due to security, needing to meet with a provider representative).

SUMMARY

One example embodiment relates to a system including a smart table communicably coupled to a provider computing system. The smart table includes a table display screen, and a processing circuit comprising a processor coupled to non-transitory memory, wherein the processing circuit is configured to control an image displayed on the table display screen, send a pairing request to a customer device in response to a session trigger event being detected, wherein the customer device is associated with a customer account associated with the provider computing system, pair with the customer device based on a pairing input received from the customer device in response to the pairing request, pair with a provider device, mirror the image displayed on the table display screen on a customer display screen of the customer device and on a provider display screen of the provider device, receive a first customer input from the customer device based on the customer interacting with the image mirrored on the customer display screen, modify the image displayed on the table display screen to display the first customer input in real-time with respect to the customer interacting with the image, mirror the modified image showing the first customer input on the provider device, receive a second customer input from the customer device based on the customer interacting with the image mirrored on the customer display screen, wherein the second customer input comprises sensitive information, modify the image displayed on the table display screen to display an indication of the second customer input in real-time with respect to the customer interacting with the image, wherein the indication obscures the sensitive information, display the sensitive information on the customer display screen and on the provider display screen, and unpair with the customer device based on an end session trigger event being detected.

Another example embodiment relates to a system including a smart table communicably coupled to a provider computing system. The smart table includes a touch screen display, a sensor system, and a processing circuit comprising a processor coupled to non-transitory memory, wherein the processing circuit is configured to control an image displayed on the touch screen display receive sensor data from the sensor system, pair with a customer device associated with a customer account associated with a customer in response to a session trigger event being detected by the sensor system, wherein the customer device includes a screen configured to display a user interface comprising account information associated with the customer account, mirror a portion of the account information displayed on the customer device on the touch screen display, receive a customer input from the customer device, display the customer input on the touch screen display in real-time, receive sensitive customer information from the customer device, provide the sensitive customer information to the provider computing system, wherein the sensitive customer information is obscured on the touch screen display, unpair with the customer device based on determining an end session trigger event being detected by the sensor system.

Another example embodiment relates to a smart table including a tabletop touchscreen display, and a processing circuit comprising a processor coupled to non-transitory memory, wherein the processing circuit is configured to pair with a customer device associated with a customer account based on a session trigger event being detected, control an image that is simultaneously displayed on the tabletop touchscreen display and on the paired customer device, wherein the image includes sensitive customer information, wherein the sensitive customer information is displayed on the customer device, and wherein the sensitive customer information is obscured on the tabletop touchscreen display.

These and other features, together with the organization and manner of operation thereof, will become apparent from the following detailed description when taken in conjunction with the accompanying drawings.

Figure 1A:
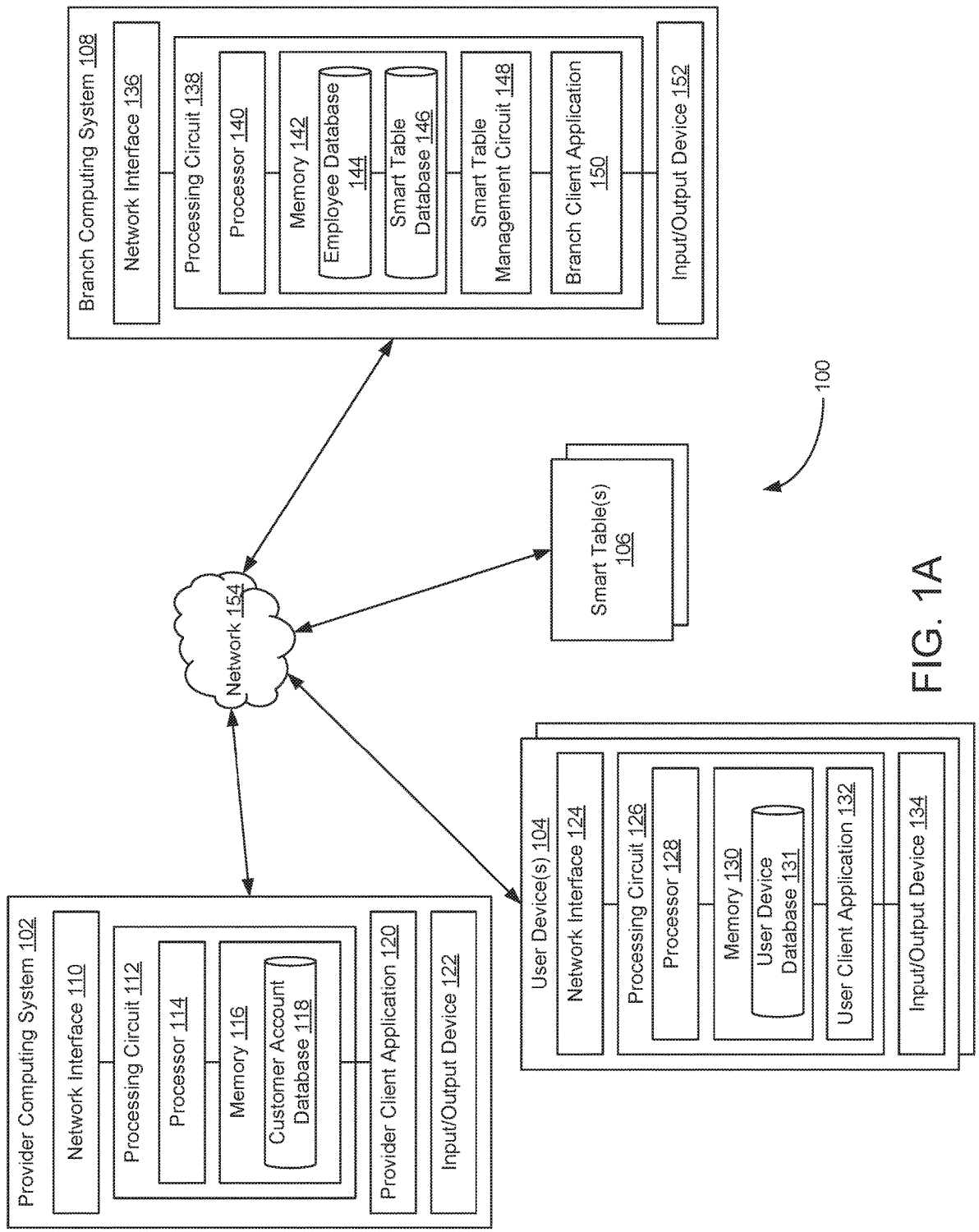
FIG. 1A is a block diagram of a smart table system including a provider computing system and a smart table, according to example embodiments.

It will be recognized that the figures are schematic representations for purposes of illustration. The figures are provided for the purpose of illustrating one or more embodiments with the explicit understanding that they will not be used to limit the scope or the meaning of the claims.

DETAILED DESCRIPTION

Referring generally to the figures, systems and methods for two way screen mirroring are shown and described. As is described further herein, the system and methods for two way screen mirroring may utilize a smart table system, including a smart table, to improve customer transparency, facilitate the secure transfer of customer data, protect a customer's private information, accelerate customer transactions, and generally improve a customer's transaction experience.

Conventional computing devices used at a place of business, such as, for example, desktop computers and tablets, provide employees (e.g., cash register, bank teller, account manager, consultant, etc.) with a convenient and secure terminal for carrying out transactions. For example, a computer at a local branch of a provider may be used during a transaction to assist a customer complete a transaction, such as opening a checking account, transferring a sum of money, take out a loan, etc.

During the transaction, the convention computing device may display information needed by the employee to complete the transaction for the customer. For example, during a banking transaction, the convention computing device may display information about the customer's account, the products and services available to the customer, available promotions, etc. However, the information displayed on the conventional computing device may not be visible to the customer thereby reducing customer transparency.

Further, the customer may be asked to verbally provide sensitive information to complete the transaction. However, if the transaction occurs in a public facility, such as a local branch of a provider, verbally providing the sensitive information may present a security risk as this information may be overheard by an undesired party. Additionally, the information verbally provided to the employee may need to be manually entered by the employee into the computing device, which may increase the time needed to complete the transaction and may result in inaccurate information being entered into the computing device.

As is described further herein, a smart table system is disclosed. The smart table system may include a display screen located on the surface of the display table such that the display screen is visible to both the employee and customer during a transaction. The display screen may display information that may be used to facilitate the transaction between an employee and a customer. For example, during a banking transaction, certain information (e.g., account information, available products and services, promotional information, etc.) may be displayed on the display screen such that the employee and customer may collaborate during the transaction. Therefore, information regarding the transaction does not need to be verbally provided to the customer. This may reduce the time needed to complete the transaction and reduce the risk of inaccurate information being verbally provided to the customer. Thus, the embodiments described herein are improve upon existing systems by reducing or eliminating the need to verbally exchange information between an employee and a customer.

The smart table may be further configured to pair with a user device, or multiple user devices, such that data may be transferred between the smart table and the user device. For example, the smart table may include a sensor that is configured to detect a user device (e.g., a cell phone) operated by the customer or a customer approaching the smart table. When the smart table detects the user device or the customer, the smart table may pair with the user device operated by the customer, thereby enabling communication of information between the user device and the smart table. In certain embodiments, some or all of the information displayed on the smart table may be displayed on the user device and vice versa (i.e., two way screen mirroring). Therefore, the customer may use the user device to navigate, browse, and make selections, which may be reflected on the smart table enabling collaboration between the employee and the customer. Similarly, the employee may make selections on the smart table, or a different user device that is paired to the smart table, and these selections may be sent to the customer's user device. Further, the customer may begin a transaction on the user device and pair the user device with the smart table thereby sending the partially completed transaction to the smart table. The partially completed transaction may then be displayed on the smart table such that an employee may assist the customer with completing the transaction.

Further, the customer may use the user device to send secure information to the smart table. For example, the customer may be asked to provide private information (e.g., birthdate, home address, social security number, account number, driver's license number, etc.) as a part of the transaction. Rather than verbally providing the private information, or entering the private information on the smart table, where it may be visible to an undesired person, the customer may enter the information into the user device and send the information to the smart table as a part of the transaction. Therefore, the user device may be used as a secure input device for the smart table. Thus, the embodiments described herein improve upon the technical field of secure data input.

The smart table system further improves identity verification at a branch location by using the user device of the user to authenticate the user as part of initiating a session using the smart table system. For example, the smart table system can provision a random code (e.g., token) to the user device and receive correspondence back from the user device including authentication information (e.g., biometric data, token, geometric data) such that a processing circuit of the smart table system can analyze and authenticate the user (e.g., cross-reference a token vault, cross-reference biometric templates, cross-reference latitude and longitude of known locations) for a sessions at the smart table system (e.g., automatically send a control signal to an input of the smart table system to provide access to view user interfaces on a smart headset and/or the smart table).

Referring to FIG. 1A, a block diagram of a smart table system 100 is shown, according to potential embodiments. The smart table system 100 includes a provider computing system 102 associated with a provider, such as a service provider, bank, or financial institution (FI). The smart table system 100 further includes one or more user devices (e.g., user device 104), one or more smart tables (e.g., smart table 106), and a branch computing system 108 (e.g., a computing system of a branch location of the provider). In some embodiments, the provider computing system 102, user device 104 (as well as any additional user devices), smart table 106 (and any additional smart tables), and branch computing system 108 are directly communicably coupled. In some embodiments, the components of smart table system 100 may be communicably and operatively coupled to each other over a network, such as network 154, that permits the direct or indirect exchange of data, values, instructions, messages, and the like (represented by the double-headed arrows in FIG. 1). The network 154 may include one or more of a cellular network, the Internet, Wi-Fi™, Wi-Max™, a proprietary provider network, a proprietary retail or service provider network, and/or any other kind of wireless or wired network.

Each system or device in the smart table system 100 may include one or more processors, memories, network interfaces and user interfaces. The memory may store programming logic that, when executed by the processor, controls the operation of the corresponding computing system or device. The memory may also store data in databases. For example, memory 142 may store programming logic that when executed by processor 140 within processing circuit 138, causes employee database 144 to update information for an employee account with communications received from a user device 104. The network interfaces (e.g., network interface 110 of provider computing system 102) may allow the computing systems and devices to communicate wirelessly or otherwise. The various components of devices in smart table system 100 may be implemented via hardware (e.g., circuitry), software (e.g., executable code), or any combination thereof. Devices and components in FIG. 1 can be added, deleted, integrated, separated, and/or rearranged in various embodiments of the disclosure.

The provider computing system 102 may be managed by a provider, such as a credit card issuer, a consultant, a retailer, a service provider, and/or the like. The provider computing system 102 includes a network interface 110, a processing circuit 112, and an input/output device 122. The network interface 110 is structured and used to establish connections with other computing systems and devices (e.g., the user devices 104, the smart tables 106, the branch computing system 108, etc.) via the network 154. The network interface 110 includes program logic that facilitates connection of the provider computing system 102 to the network 154. For example, the network interface 110 may include any combination of a wireless network transceiver (e.g., a cellular modem, a Bluetooth™ transceiver, a WiFi transceiver, etc.) and/or a wired network transceiver (e.g., an Ethernet transceiver). In some arrangements, the network interface 110 includes the hardware and machine-readable media sufficient to support communication over multiple channels of data communication. Further, in some arrangements, the network interface 110 includes cryptography capabilities to establish a secure or relatively secure communication session in which data communicated over the session is encrypted.

The processing circuit 112 includes a processor 114, a memory 116, and a provider client application 120. The memory 116 may be one or more devices (e.g., RAM, ROM, Flash memory, hard disk storage) for storing data and/or computer code for completing and/or facilitating the various processes described herein. The memory 116 may be or include non-transient volatile memory, non-volatile memory, and non-transitory computer storage media. Memory 116 may include database components, object code components, script components, or any other type of information structure for supporting the various activities and information structures described herein. Memory 116 may be communicably coupled to the processor 114 and include computer code or instructions for executing one or more processes described herein. The processor 114 may be implemented as one or more application specific integrated circuits (ASICs), field programmable gate arrays (FPGAs), a group of processing components, or other suitable electronic processing components. As such, the provider computing system 102 is configured to run a variety of application programs and store associated data in a database of the memory 116 (e.g., customer account database 118). One such application may be the provider client application 120.

The memory 116 may store a customer account database 118, according to some embodiments. The customer account database 118 may be configured to store updated personal information for customer accounts associated with the provider. For example, the customer account database 118 saves personal user information, such as name, age, gender, address, education, occupation, etc., customer preferences, such as notification preferences, security preferences, etc., and authentication information, such as customer passwords, biometric data for the customer, geometric information (e.g., latitude, longitude), etc. In some embodiments, the customer account database 118 includes a token vault that stores an associated customer token and/or device token for each customer account. The customer account database 118 may further be configured to store financial data for each customer account, such as past transactions, different provider account information (e.g., balances, debt, type of account, etc.), investments, loans, mortgages, and so on.

In some embodiments, the provider client application 120 may be incorporated with an existing application in use by the provider computing system 102 (e.g., a mobile provider application, a service provider application, etc.). In other embodiments, the provider client application 120 is a separate software application implemented on the provider computing system 102. The provider client application 120 may be downloaded by the provider computing system 102 prior to its usage, hard coded into the memory 116 of the provider computing system 102, or be a network-based or web-based interface application such that the provider computing system 102 may provide a web browser to access the application, which may be executed remotely from the provider computing system 102. Accordingly, the provider computing system 102 may include software and/or hardware capable of implementing a network-based or web-based application. For example, in some instances, the provider client application 120 includes software such as HTML, XML, WML, SGML, PHP (Hypertext Preprocessor), CGI, and like languages.

In the latter instance, a user (e.g., a provider employee) may have to log onto or access the web-based interface before usage of the application. In this regard, the provider client application 120 may be supported by a separate computing system (e.g., user device 104) including one or more servers, processors, network interface, and so on, that transmit applications for use to the provider computing system 102.

In certain embodiments, the provider client application 120 includes an application programming interface (API) and/or a software development kit (SDK) that facilitate the integration of other applications with the provider client application 120. For example, the provider client application 120 is configured to utilize the functionality of the branch computing system 108 by interacting with the branch client application 150 through an API.

Still referring to FIG. 1, the input/output device 122 is structured to receive communications from and provide communications to provider employees associated with the provider computing system 102. The input/output device 122 is structured to exchange data, communications, instructions, etc. with an input/output component of the provider computing system 102. In one embodiment, the input/output device 122 includes communication circuitry for facilitating the exchange of data, values, messages, and the like between the input/output device 122 and the components of the provider computing system 102. In yet another embodiment, the input/output device 122 includes machine-readable media for facilitating the exchange of information between the input/output device and the components of the provider computing system 102. In yet another embodiment, the input/output device 122 includes any combination of hardware components, communication circuitry, and machine-readable media.

In some embodiments, the input/output device 122 includes suitable input/output ports and/or uses an interconnect bus (not shown) for interconnection with a local display (e.g., a touchscreen display) and/or keyboard/mouse devices (when applicable), or the like, serving as a local user interface for programming and/or data entry, retrieval, or other user interaction purposes. As such, the input/output device 122 may provide an interface for the user to interact with various applications (e.g., the provider client application 120) stored on the provider computing system 102. For example, the input/output device 122 includes a keyboard, a keypad, a mouse, joystick, a touch screen, a microphone, a camera device, a biometric device, a virtual reality headset, smart glasses, and the like. As another example, input/output device 122, may include, but is not limited to, a television monitor, a computer monitor, a printer, a facsimile, a speaker, and so on.

The branch computing system 108 similarly includes a network interface 136, a processing circuit 138, and an input/output device 152. The network interface 136, the processing circuit 138, and the input/output device 152 may function substantially similar to and include the same or similar components as the components of provider computing system 102, such as the network interface 110, the processing circuit 112, and the input/output device 122, described above. As such, it should be understood that the description of the network interface 110, the processing circuit 112, and the input/output device 122 of the provider computing system 102 provided above may be similarly applied to the network interface 136, the processing circuit 138, and the input/output device 152 of the branch computing system 108.

For example, the network interface 136 is similarly structured and used to establish connections with other computing systems (e.g., the provider computing system 102, the user devices 104, and/or the smart tables 106) via the network 154. The network interface 136 may further include any or all of the components discussed above, with reference to the network interface 110.

The processing circuit 138 similarly includes a processor 140 and a memory 142. The processor 140 and the memory 142 are substantially similar to the processor 114 and the memory 116 described above, with reference to the provider computing system 102. In some embodiments, the memory 142 includes an employee database 144 and a smart table database 146. The employee database 144 may be structured to store data concerning each employee associated with the branch location. In some embodiments, the employee database 144 may store data regarding an identification number, a job position, authorization information, contact information, a schedule, customer history, work history, an associated user device 104, credentials, and so forth, of an employee that works at the branch location associated with the branch computing system 108. For example, the employee database 144 may save biometric information (e.g., a fingerprint scan, an eye scan, a voice memo, etc.) and a password (e.g., PIN, alphanumeric code, QR code, barcode, etc.) for each employee at the branch location. As another example, the employee database 144 stores security and data access rights for each employee that are utilized in conducting particular transactions (high-risk transactions, transactions with high-confidentiality customers, etc.).

Additionally, the employee database 144 may include the types of trainings each employee has received, the clearances (e.g., access) that each employee has obtained, a trustworthiness score for each employee, and any other pertinent information pertaining to each employee that may be used to determine the employees qualifications for performing various transactions and other tasks using a smart table 106.

The smart table database 146 may be structured to store data for each smart table 106 at the branch location. The smart table database 146 may save information regarding an identification number of each smart table 106, service history information (e.g., a last date a smart table was serviced for repairs and/or updates), transaction history information (e.g., number of customers that used the smart table 106), scheduling information (e.g., customers assigned to the smart table 106 for an upcoming smart table provider session, and/or power status (e.g., charging, operating on a low battery level, etc.). For example, the smart table database 146 may store a schedule of which customers will be using a particular smart table 106 at the branch location. Beneficially, this may allow for branch managers to more effectively plan out smart table provider sessions and decrease the likelihood of scheduling conflicts, such as two customers having conflicting sessions at the same smart table 106.

The processing circuit 138 also is shown to include a smart table management circuit 148. In some embodiments, the smart table management circuit 148 is configured to receive new data (e.g., from the network 154) relating to employees and smart tables 106 at a branch location. The smart table management circuit 148 may then update a correct, corresponding database (e.g., employee database 144 or smart table database 146). In some embodiments, the smart table management circuit 148 is configured to receive requests from customers for an appointment at a smart table 106. The smart table management circuit 148 may then schedule the appointment based on what the client wants to accomplish during the provider session (e.g., to ensure the assigned smart table 106 has the necessary capabilities, such as a functional cash dispenser, credit card printer, check depositor, biometric authenticator, and so on) and the available smart tables 106 during a time slot desired by the customer.

The smart table management circuit 148 may also be configured to identify which employees may be needed (e.g., based on experience and/or access) at a smart table 106 in order to conduct a planned transaction with a customer during a provider session. For example, in generating a request for a smart table provider session, a customer may be asked (e.g., via the user device 104 associated with the customer) what type of transaction or provider task does the customer want to complete during the smart table session. In some embodiments, the smart table management circuit 148 may generate and transmit a notification to user device 104 of an employee that a new smart table provider session, assigned to the employee, has been scheduled.

Although the employee database 144, smart table database 146, and smart table management circuit 148 are shown as being a part of the branch computing system 108, these components may alternatively be a part of the provider computing system 102 and/or integrated into one or more smart tables 106. In other embodiments, each of the provider computing system 102 and the branch computing system 108 may include a corresponding smart table management circuit the same as or similar to the smart table management circuit 148.

The branch computing system 108 is similarly structured as the provider computing system 102 to run a variety of application programs and store associated data in a database of the memory 142. One such application may be the branch client application 150, for example.

The branch client application 150 may be substantially similar to the provider client application 120, but may instead be tailored toward branch employees or a branch manager at the branch location. For example, branch client application 150 is structured to generate user interfaces to display on a smart table 106 to facilitate improved customer experiences and employee interactions during an established provider session. Particularly, the branch client application 150 is configured to communicate with the provider computing system 102, the user devices 104 (e.g., customer user devices and employee user devices), and smart tables 106 to receive instructions or documents from the provider computing system 102 and/or the branch computing system 108 to complete specific tasks during a provider session at a smart table 106. Furthermore, the branch client application 150 may be configured to communicate reminders to user devices 104 of employees regarding upcoming provider sessions at a smart table 106 and/or ongoing provider sessions at a smart table 106 to perform a task associated with the provider session. For example, the branch client application 150 may be configured to generate a reminder for a branch employee to prepare a smart table 106 for an upcoming provider session. Accordingly, the branch client application 150 is communicably coupled to the provider computing system 102 (e.g., through interactions with the provider client application 120), the user devices 104 (e.g., through interactions with the user client application 132), and the smart tables 106 (e.g., through interactions with the smart table client application 218 (FIG. 2)).

The branch client application 150 may thus communicate with the provider computing system 102, the user devise 104, and the smart tables 106 to perform a variety of functions. For example, the branch client application 150 is configured to reset a display of a smart table 106 (e.g., reset a display to a generic welcome display or sleep mode display) at the end of a provider session with a customer. As such, the branch client application 150 allows for a branch manager and branch employees associated with the branch location to monitor and update user interfaces of the smart tables 106 before, during, and after provider sessions with one or more customers paired to one of the smart tables 106.

The input/output device 152 may function substantially similarly to and include the same or similar components as the input/output device 122 described above, with reference to the provider computing system 102. Accordingly, it will be understood that the description of the input/output device 122 described above may also be applied to the input/output device 152 of the branch computing system 108. As an example, the input/output device 152 is similarly structured to receive communications from and provide communications to user devices 104 of branch employees and/or the branch manager associated with the branch computing system 108.

The smart table system 100 also includes one or more user devices 104, according to some embodiments. The user devices 104 may be a variety of suitable user computing devices. For example, the user devices 104 may include mobile phones. In other embodiments, the user devices 104 include personal computers (e.g., desktop computers or laptop computers), tablets, smart watches or other wearable devices (e.g., rings, jewelry, headsets, bands), smart glasses, headphones, smart vehicle voice/touch command systems, virtual/augmented reality (VR/AR) systems (e.g., smart glasses), appliances, interne of things (IoT) devices, voice assistants, at-home touch screen display systems, and/or any other suitable user computing devices capable of accessing and communicating using local and/or global networks (e.g., the network 154). The user devices 104 may be associated with employees or with customers of the provider. As such, the customer account database 118 may be further configured to store device information concerning each user device 104 associated with a customer of the provider. Similarly, the employee database 144 may be further configured to store device information pertaining to each user device 104 of an employee at a branch location. For example, the device information may include a device form (e.g., the type of user device 104), a set of device capabilities (e.g., types of input/output devices, device mobility, operating system, installed applications, camera capabilities, device communication capabilities, and so on), device location information (e.g., geolocation data such as, latitude and longitude information), and/or device identification and authentication information (e.g., an encrypted device token for each user device 104, user authentication information, such as a PIN or biometric data, associated with each user device 104, etc.).

The user devices 104 may each similarly include a network interface 124, a processing circuit 126, and an input/output device 134. The network interface 124, the processing circuit 126, and the input/output device 134 may be structured and function substantially similar to and include the same or similar components as the network interface 110, the processing circuit 112, and the input/output device 122 described above, with reference to the provider computing system 102. Therefore, it should be understood that the description of the network interface 110, the processing circuit 112, and the input/output device 122 of the provider computing system 102 provided above may be similarly applied to the network interface 124, the processing circuit 126, and the input/output device 134 of each of the user devices 104.

In some embodiments, the network interface 124 is similarly structured and used to establish connections with other computing systems (e.g., the provider computing system 102, the branch computing system 108, other user devices 104, and the smart tables 106) via the network 154. The network interface 124 may further include any or all of the components discussed above, with reference to the network interface 110.

The processing circuit 126 similarly includes a memory 130 and a processor 128. The memory 130 and the processor 128 are substantially similar to the memory 116 and the processor 114 described above. Accordingly, the user devices 104 are similarly configured to run a variety of application programs and store associated data in a database of the memory 130 (e.g., user device database 131). For example, the user devices 104 may be configured to run an application such as the user client application 132 that is stored in the user device database 131. In another example, the user devices 104 may be configured to store various user data, such as, but not limited to, personal user device information (e.g., names, addresses, phone numbers, contacts, call logs, installed applications, and so on), user device authentication information (e.g., username/password combinations, device authentication tokens, security question answers, unique client identifiers, biometric data (such as digital representations of biometrics), geographic data, social media data, application specific data, and so on), and user device provider information (e.g., token information, account numbers, account balances, available credit, credit history, exchange histories, and so on) relating to the various accounts.

The user client application 132 may be substantially similar to the provider client application 120, the branch client application 150, and the smart table client application 218 (FIG. 2), but may instead be specifically tailored to the user associated with the user devices 104. For example, the user client application 132 is similarly structured to selectively provide displays and/or audio/visual communications to each user device 104 to allow for improved interactions between a customer and branch employees, branch managers, and provider employees.

Particularly, the user client application 132 is configured to communicate with the provider computing system 102, the branch computing system 108, and the smart tables 106 to facilitate user interactions with a smart table 106 during a provider session at a branch location. As such, the user devices 104 are communicably coupled to the provider computing system 102 (e.g., through interactions with the provider client application 120), the branch computing system 108 (e.g., through interactions with the branch client application 150), and the smart tables 106 (e.g., through interactions with the smart table client application 218 (FIG. 2)).

The user client application 132 may therefore communicate with the provider computing system 102, the smart tables 106, and the branch computing system 108 to perform a variety of functions. For example, the user client application 132 is similarly configured to receive user inputs (e.g., via a user interface of the user device 104) to complete provider interactions during a user session with a smart table 106, depending on whether the individual associated with the user device 104 is an employee or a customer. Additionally, the user client application 132 is configured to output information to a display of the user device 104 regarding information on the provider interaction. For example, the user client application 132 is configured to generate a user interface to show graphics regarding a financial history of a customer.

The user client application 132 is further configured to allow for communication with the provider client application 120 to allow a user associated with the various user devices 104 to update account information and/or provide feedback during a provider session with a smart table 106. Accordingly, the user client application 132 facilitates effective communication with a branch manager, other branch employees, the provider employees, and/or other customers (e.g., during a provider session with two customers, such as a mother and daughter) during a connected session with a smart table 106.

The user client application 132 may also be structured to allow the user devices 104 to retrieve and submit documents, forms, and/or any type of necessary information to and/or from a smart table 106 during an established session, as required to complete certain financial tasks. In some instances, the user client application 132 may be configured to automatically retrieve and/or submit documents, forms, or other necessary information to and/or from a smart table 106 in response to the establishment of a secure connection to the smart table 106. In some embodiments, the user client application 132 may be configured to temporarily store the various documents, forms, and/or necessary information, which may then be selectively transmitted to the smart table 106 in response to a user input from a customer or employee (e.g., received via the input/output device 134).

In some embodiments, the user client application 132 may be configured to temporarily store the various documents, forms, and/or necessary information and then selectively transmit the various documents, forms, and/or necessary information to the smart table 106 in response to a customer's arrival at a branch location. For example, the user device 104 may automatically connect to the branch computing system 108 and/or the one or more smart tables 106 when the user device 104 is within range of a network or communication device associated with the branch computing system 104 and/or the one or more smart tables 106.

In some embodiments, a customer or employee may identify various levels of authority associated with each of the user devices 104. For example, in some implementations, a user may set a first user device 104 as a primary user device and a second user device 104 as a secondary user device. In some instances, there may be various approved users of the user devices 104, excluding the user, such as family members, caretakers, business partners for customers, or other branch employees, a branch manager, a supervising employee for employees at the branch location. As such, in some embodiments, a primary user device may have the authority to veto or cancel the actions taken by a secondary user device.

Furthermore, the user client application 132 may be configured to provide a device status for each user device 104 to the provider session management circuit 210 (FIG. 2) of a smart table 106. The device status may include both a device location and an indication of whether the respective user device 104 is active (e.g., turned on, connected to the interne, active notifications, within a specific distance, communicating with a beacon, currently used, any combination, and so on). For example, the user client application 132 may be configured to automatically, periodically, and/or selectively provide geographical location information (e.g., latitude and longitude) to the provider session management circuit 210. Additionally, the user client application 132 may be configured to send the provider session management circuit 210 a notification and/or an update when a given user device 104 is active.

In some embodiments, a user device 104 may be considered active if, for example, the user device 104 is currently being used (e.g., by a customer or by an employee during a provider session with a smart table 106), a user has indicated that the provider computing system 102, the branch computing system 108, and/or the smart tables 106 are permitted to send/retrieve data to/from the user device 104, and/or the user device 104 is within a predetermined distance from the branch computing system 108 or one of the smart tables 106.

In some embodiments, there may be additional manners in which the user device 104 may be considered active.

The input/output device 134 of each user device 104 may function substantially similar to and include the same or similar components as the input/output device 122 previously described, with reference to the provider computing system 102. As such, it should be understood that the description of the input/output device 122 provided above may also be applied to the input/output device 134 of each of the user devices 104. In some embodiments, the input/output device 134 of each user device 104 is similarly structured to receive communications from and provide communications to a user (e.g., customer or employee) associated with the plurality of user devices 104.

For example, the input/output device 134 may include one or more user interfaces, which may include one or more biometric sensors (such as an iris scanner, a fingerprint scanner, a heart monitor that identifies cardiovascular signals, etc.). The input/output device 134 may also include components that provide perceptible outputs (such as displays and light sources for visually-perceptible elements, a speaker for audible elements, and haptics for perceptible signaling via touch, etc.) and/or that permit the user to enter inputs (such as a stylus or force sensor for detecting pressure on a display screen). One or more user devices 104 may include one or more locations sensors to allow the user devices 104 to detect its location relative to other physical objects (e.g., a smart table 106 or other user devices) or geographic locations. Example locations sensors may include global positioning system (GPS) devices and other navigation and geolocation devices, digital compasses, gyroscopes and other orientation sensors, as well as proximity sensors or other sensors that permit the user device 104 to determine the presence and relative distance of nearby devices, objects, and/or locations.

Still referring to FIG. 1, the smart table system 100 includes one or more smart tables 106. The smart tables 106 may be tables of varying sizes integrated with cash handling endpoints. Furthermore, the smart tables 106 may provide a shared graphical user interface for various scenarios. In some embodiments, each of the smart tables 106 are associated with a smart table identifier, such as a numeric or alphanumeric code, to identify the respective smart table to the branch computing system 108, the provider computing system 102, and the user devices 104. For example, in response to walking into a lobby of a branch location for a scheduled provider session, a user device 104 associated with the customer may indicate to the customer which smart table 106 to go to in order to initiate the session. While described with regards to a FI, the smart tables 106 may be used in other scenarios. For example, the smart tables 106 may be used at a car dealership or car rental company, a hotel, a booking agent, and/or a medical office. The features of the smart tables 106 are described in greater detail below, with reference to FIG. 2.

Figure 1B:
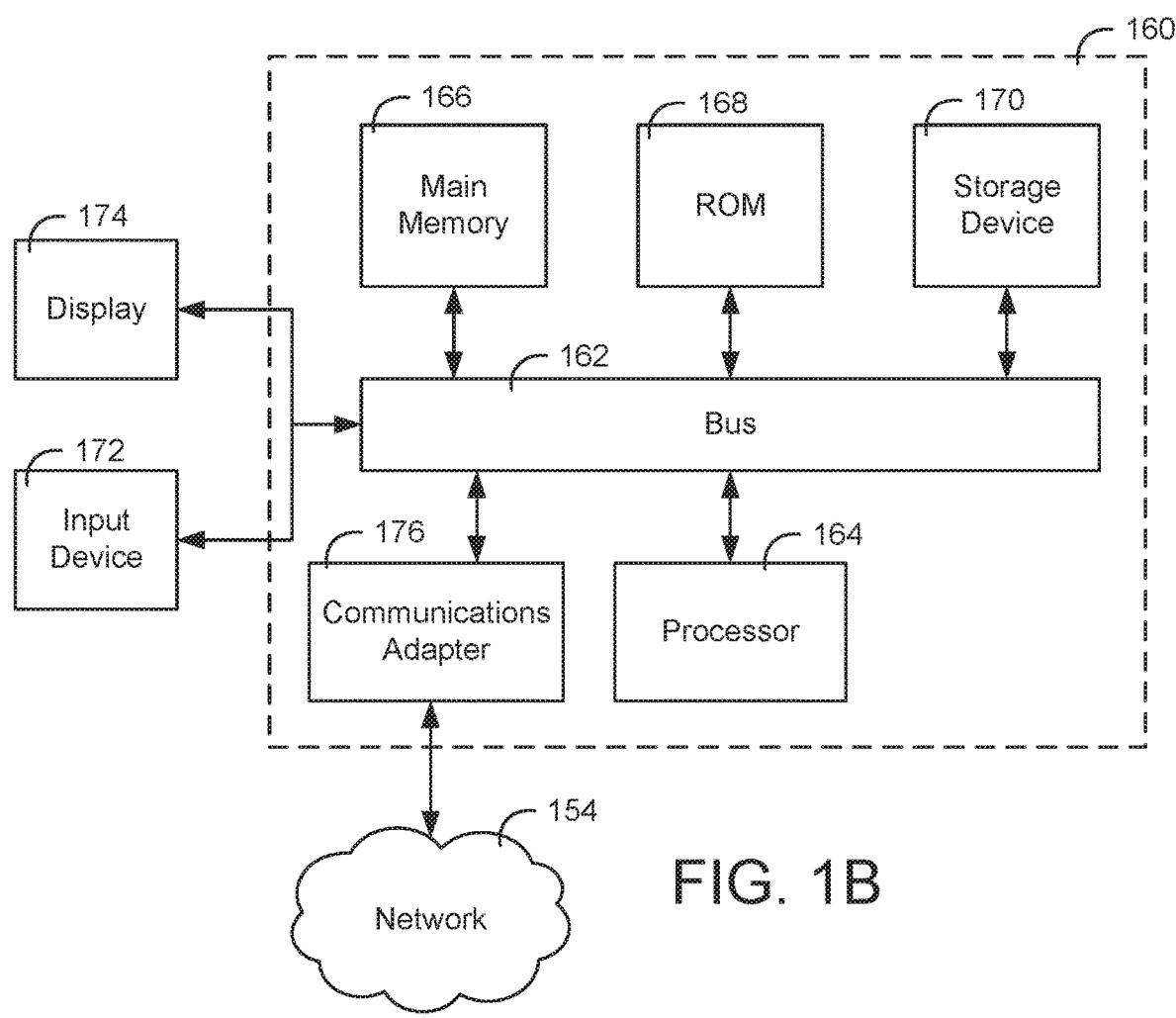
FIG. 1B is a block diagram illustrating an example computing system suitable for use in the various embodiments described herein.

FIG. 1B illustrates a depiction of a computing system 160 that can be used, for example, to implement a smart table system 100, provider computing system 102, user device 104, smart tables 106, branch computing system 108, and/or various other example systems described in the present disclosure. The computing system 160 includes a bus 162 or other communication component for communicating information and a processor 164 coupled to the bus 162 for processing information. The computing system 160 also includes main memory 166, such as a random-access memory (RAM) or other dynamic storage device, coupled to the bus 162 for storing information, and instructions to be executed by the processor 164. Main memory 166 can also be used for storing position information, temporary variables, or other intermediate information during execution of instructions by the processor 164. The computing system 160 may further include a read only memory (ROM) 168 or other static storage device coupled to the bus 162 for storing static information and instructions for the processor 164. A storage device 170, such as a solid-state device, magnetic disk or optical disk, is coupled to the bus 162 for persistently storing information and instructions.

The computing system 160 may be coupled via the bus 162 to a display 174, such as a liquid crystal display, or active matrix display, for displaying information to a user. An input device 172, such as a keyboard including alphanumeric and other keys, may be coupled to the bus 162 for communicating information, and command selections to the processor 164. In another arrangement, the input device 172 has a touch screen display 174. The input device 172 can include any type of biometric sensor, a cursor control, such as a mouse, a trackball, or cursor direction keys, for communicating direction information and command selections to the processor 164 and for controlling cursor movement on the display 174.

In some arrangements, the computing system 160 may include a communications adapter 176, such as a networking adapter. Communications adapter 176 may be coupled to bus 162 and may be configured to enable communications with a computing or communications network 154 and/or other computing systems. In various illustrative arrangements, any type of networking configuration may be achieved using communications adapter 176, such as wired (e.g., via Ethernet), wireless (e.g., via WiFi, Bluetooth™, and so on), satellite (e.g., via GPS) pre-configured, ad-hoc, LAN, WAN, and so on.

According to various arrangements, the processes that effectuate illustrative arrangements that are described herein can be achieved by the computing system 160 in response to the processor 164 executing an arrangement of instructions contained in main memory 166. Such instructions can be read into main memory 166 from another computer-readable medium, such as the storage device 170. Execution of the arrangement of instructions contained in main memory 166 causes the computing system 160 to perform the illustrative processes described herein. One or more processors in a multi-processing arrangement may also be employed to execute the instructions contained in main memory 166. In alternative arrangements, hard-wired circuitry may be used in place of or in combination with software instructions to implement illustrative arrangements. Thus, arrangements are not limited to any specific combination of hardware circuitry and software.

Although an example processing system has been described in FIG. 1B, arrangements of the subject matter and the functional operations disclosed herein can be carried out using other types of digital electronic circuitry, or in computer software (e.g., application, block chain, distributed ledger technology) embodied on a tangible medium, firmware, or hardware, including the structures disclosed in this specification and their structural equivalents, or in combinations of one or more of them. Arrangements of the subject matter disclosed herein can be implemented as one or more computer programs, e.g., one or more subsystems of computer program instructions, encoded on one or more computer storage medium for execution by, or to control the operation of, data processing apparatus. Alternatively, or in addition, the program instructions can be encoded on an artificially generated propagated signal, e.g., a machine generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium is both tangible and non-transitory.

Although shown in the arrangements of FIG. 1B as singular, stand-alone devices, one of ordinary skill in the art will appreciate that, in some arrangements, the computing system 160 may include virtualized systems and/or system resources. For example, in some arrangements, the computing system 160 may be a virtual switch, virtual router, virtual host, virtual server, etc. In various arrangements, computing system 160 may share physical storage, hardware, and other resources with other virtual machines. In some arrangements, virtual resources of the network 154 (e.g., network 154 of FIG. 1) may include cloud computing resources such that a virtual resource may rely on distributed processing across more than one physical processor, distributed memory, etc.

As used herein, the term "resource" refers to a physical or virtualized (for example, in cloud computing environments) computing resource needed to execute computer-based operations. Examples of computing resources include computing equipment or device (server, router, switch, etc.), storage, memory, executable (application, service, and the like), data file or data set (whether permanently stored or cached), and/or a combination thereof (for example, a set of computer-executable instructions stored in memory and executed by a processor, computer- readable media having data stored thereon, etc.).

Figure 2:
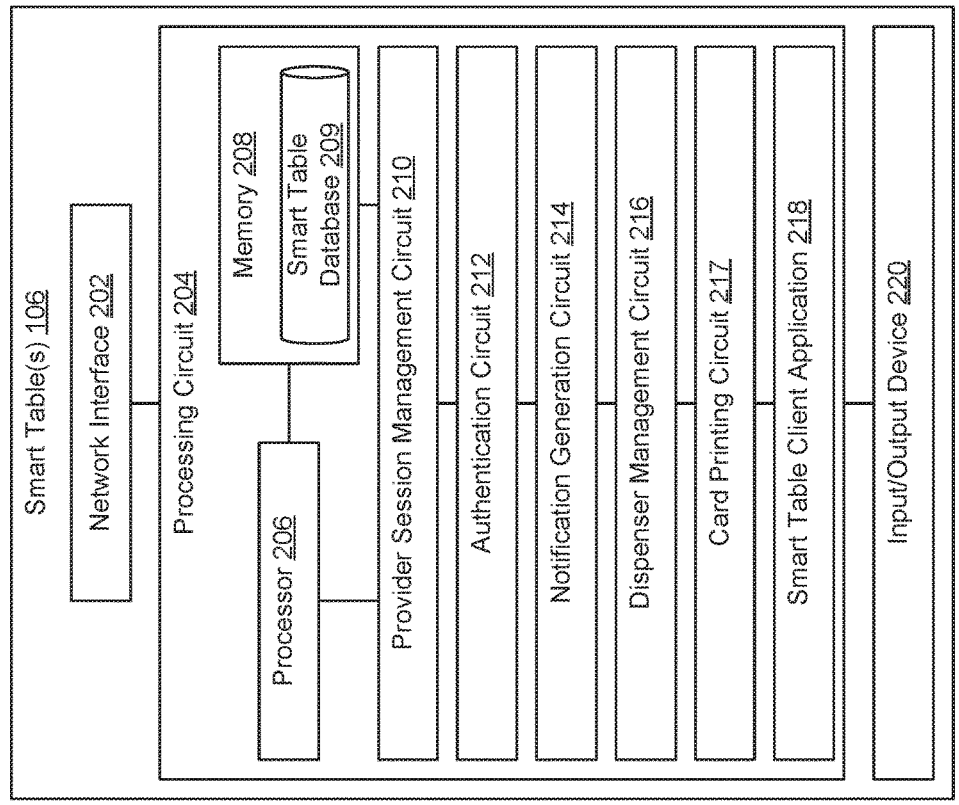
FIG. 2 is a block diagram of the smart table of FIG. 1, according to example embodiments.

Referring now to FIG. 2, a block diagram of the smart tables 106 is shown, according to some embodiments. The smart tables 106 each similarly include a network interface 202, a processing circuit 204, and an input/output device 220. The network interface 202, the processing circuit 204, and the input/output device 220 may function substantially similar to and include the same or similar components as the network interface 110, the processing circuit 112, and the input/output device 122 described above, with reference to the provider computing system 102. Thus, it should be understood that the description of the network interface 110, the processing circuit 112, and the input/output device 122 of the provider computing system 102 provided above may be similarly applied to the network interface 202, the processing circuit 204, and the input/output device 220 of each of the smart tables 106.

For example, the network interface 202 is similarly structured and used to establish connections with other computing systems (e.g., the provider computing system 102, the branch computing system 108, the user devices 104) via the network 154. The network interface 202 may further include any or all of the components discussed above, with reference to the network interface 110.

The processing circuit 204 similarly includes a processor 206 and a memory 208. The processor 206 and the memory 208 are substantially similar to the processor 114 and the memory 116 described above. As such, the smart tables 106 are similarly configured to run a variety of application programs and store associated data in a database (e.g., smart table database 209) of the memory 208. For example, the smart tables 106 may be configured to run the smart table client application 218 that is stored in the smart table database 209. In another example, the smart tables 106 may be configured to store various provider and user data, such as, but not limited to, personal information (e.g., names, addresses, phone numbers, contacts, call logs, installed applications, and so on), authentication information (e.g., username/password combinations, device authentication tokens, security question answers, unique client identifiers), biometric data (such as digital representations of biometrics), geographic data, social media data, application specific data, and so on), and provider information (e.g., token information, account numbers, account balances, available credit, credit history, exchange histories, and so on) relating to the various users and/or various accounts.

The smart table client application 218 may be substantially similar to the provider client application 120 and the branch client application 150, but may instead be specifically for personalized provider sessions between customers and employees at the provider. For example, the smart table client application 218 is similarly structured to provide displays to each customer user device 104 to facilitate improved interactions between customers and specific branch employees associated with each smart table 106. Particularly, smart table client application 218 is configured to communicate with the provider computing system 102, the branch computing system 108, and the user devices 104 to receive instructions and notifications from the provider computing system 102 and/or the branch computing system 104 for the branch employees associated with each smart table 106 to perform various tasks associated with a provider session. Accordingly, the smart tables 106 are communicably coupled to the provider computing system 102 (e.g., through interactions with the provider client application 120), the branch computing system 108 (e.g., through interactions with the branch client application 150), and the user devices 104 (e.g., through interactions with the user client application 132), via a network (e.g., network 154).

The smart table client application 218 may therefore communicate with the provider computing system 102, the branch computing system 108, and the user devices 104 to perform several functions. For example, the smart table client application 218 is configured to receive data from the provider computing system 102 and/or the branch computing system 104 pertaining to necessary inputs for authenticating a particular transaction during a provider session. The smart table client application 218 is further configured to allow for communication with the provider client application 120 to allow the various branch employees that operate the smart tables 106 to provide questions or comments regarding any concerns with the smart tables. As such, the smart table client application 218 allows for the branch employees associated with the smart tables 106 to communicate with the customer, branch manager, and/or provider employees throughout the process of a provider session.

The input/output device 220 of each smart table 106 may function substantially similar to and include the same or similar components as the input/output device 134 described above, with reference to the user devices 104. Accordingly, it should be understood that the description of the input/output device 134 provided above may also be applied to the input/output device 220 of each of the smart tables 106. For example, the input/output device 220 of each smart table 106 is similarly structured to receive communications from and provide communications to customers paired (e.g., via a network connection, via Bluetooth™, via a shared connection, via near field communication (NFC), and so on) with a smart table 106 and to the branch employee or branch employees associated with each smart table 106.

The processing circuit 204 also includes a provider session management circuit 210, an authentication circuit 212, a notification generation circuit 214, and a cash dispenser management circuit 216, for example. In other embodiments, the processing circuit 204 may contain more or less components than shown in FIG. 2. The components of FIG. 2 are meant for illustrative purposes only, and should not be regarded as limiting in any manner. The provider session management circuit 210 may be configured to detect a trigger event for a provider session with the smart table 106. A provider session may include one customer (e.g., the smart table 106 is configured as a self-service ATM), a branch employee and a customer, a branch employee and more than one customer, and/or more than one branch employee and a customer, and/or more than one branch employee and more than one customer, according to some embodiments. For example, two customers that have a joint account together may participate in a provider session with a branch employee. In some embodiments, a trigger event (e.g., a session trigger event) includes detecting a user device 104 within a communication range of the smart table 106. In other embodiments, a trigger event includes the activation of a selectable icon on a graphical user interface of the smart table 106. In some embodiments, a trigger event (e.g., a session trigger event) includes detecting a person (e.g., a customer or employee) is within a pre-determined distance of the smart table 106. For example, the input/output device 220 may include a camera device that is configured to detect a person is within a pre-determined distance of the smart table 106. Further, the input/output device 220 may include a microphone that is configured to detect a person talking nearby the smart table 106. In response to detecting a session trigger event, the provider session management circuit 210 may be configured to send instructions to the notification generation circuit 214 to request input for customer and/or employee authentication.

In some embodiments, a trigger event (e.g., an end session trigger event) includes detecting that a user device 104 is no longer within a communication range of the smart table 106. In other embodiments, a trigger event (e.g., an end session trigger event) includes detecting that a person (e.g., a customer or employee) is no longer within a pre-determined distance of the smart table 106. For example, the input/output device 220 may include a camera device that is configured to detect a person is no longer within a pre-determined distance of the smart table 106. Further, the input/output device 220 may include a microphone that is configured to detect when a person is no longer talking nearby the smart table 106. In response to detecting an end session trigger event, the provider session management circuit 210 may be configured to send instructions to the notification generation circuit 214 to notify the customer and/or employee that the session has ended. Further, the user device In some embodiments, a trigger event (e.g., a security concern event) includes detecting that an undesired person (i.e., a person that is neither a part of the transaction nor an employee) is within a predetermined distance of the smart table 106. For example, a trigger event (e.g., a security concern event) may include detecting that an undesired user device 104 is within a communication range of the smart table 106. In other embodiments, a trigger event (e.g., a security concern event) includes detecting that an undesired person being within a pre- determined distance of the smart table 106. For example, the input/output device 220 may include a camera device that is configured to detect an undesired person is within a pre- determined distance of the smart table 106. Further, the input/output device 220 may include a microphone that is configured to detect an undesired person talking nearby the smart table 106. In response to detecting a security concern event, the processing circuit 204 may be configured to conceal some or all of the information displayed on the smart table 106.

In some embodiments, the provider session management circuit 210 is further configured to receive sensor data from the input/output device 220 of the smart table 106. For example, the provider session management circuit 210 may be configured to receive camera data of documents that a customer wants to scan and save, movement data from a motion detector, temperature sensor data, audio data indicating a selection and/or action, haptic feedback indicating selection action, and so on. Additionally, the provider session management circuit 210 may determine when to send reminders to a user device 104 of the branch employee regarding a provider session (e.g., to fill out a certain form, an individual's stress level, elevated access, manager help, to pre-load a compartment of the smart table 106) and/or when to send a session end reminder for a scheduled provider session. For example, the provider session management circuit 210 may be configured to track how much time is remaining in a scheduled session to wrap up a provider interaction with the customer.

The authentication circuit 212 may be configured to determine whether a user is authenticated to initiate a provider session and/or to complete certain provider tasks. For example, the authentication circuit 212 may be configured to request an authorization approval from the provider computing system 102 of a received PIN or biometric input. In some embodiments, the authentication circuit 212 is also configured to determine the level of authentication necessary to complete different types of financial tasks (e.g., withdrawal cash, take out a loan, make a new investment, change address, request new debit card, etc.). The authentication circuit 212 may be configured to generate a score of how authenticated a user is during a provider session. For example, a user that entered both a biometric input and an alphanumeric passcode may receive a first score of 100% authenticated, and a user that only entered a PIN may receive a second score of 50% authenticated. The authentication circuit 212 is also configured to send instructions to the cash dispenser management circuit 216 in response to receiving an approved authorization (e.g., from the provider computing system via the network 154) to dispense cash to a customer for a withdrawal request.

The notification generation circuit 214 may be configured to create alerts regarding an upcoming provider session, an in-progress provider session, and/or a completed provider session, according to some embodiments. The notification generation circuit 214 may also receive instructions on the format of a notification from the provider session management circuit 210. In some embodiments, the notification generation circuit 214 is configured to instruct the input/output device 220 of the smart table 106 to provide audible and/or visual output to a customer regarding information displayed during a provider session. For example, the notification generation circuit 214 may be configured to cause an NFC icon on a graphical user interface of the smart table 106 to flash to indicate to a user to place a user device 104 on the NFC icon to pair to the smart table 106. As another example, the notification generation circuit 214 may be configured to generate a notification that outputs a voice-over indicating the provider session will terminate within a certain time interval, such as a five minute warning to complete any unfinished tasks.

Still referring to FIG. 2, the cash dispenser management circuit 216 may be configured to control the use of the cash dispenser of the smart table 106. In some embodiments, the cash dispenser management circuit 216 is further configured to determine when the amount of available cash at the smart table 106 is below a threshold value (e.g., $100). The cash dispenser management circuit 216 may then instruct the notification generation circuit 214 to create a notification of the low amount of cash at the smart table 106 to the branch computing system 108 and/or a user device 104 (e.g., a branch manager user device 104). In some embodiments, the cash dispenser management circuit 216 is also configured to transmit an instruction to update a balance of the customer account to the provider computing system 102, for example, after the transaction request is completed. The cash dispenser management circuit 216 may further be configured to instruct the input/output device 220 of the smart table 106 to print a receipt with transaction details, such as the amount of cash withdrawn, the time of the completed transaction, and/or an updated balance for the customer account used to complete the transaction.

The card printing circuit 217 may be configured to control the use of the card printer of the smart table 106. In some embodiments, the card printing circuit 217 is further configured to determine various information for printing a card (e.g., debit card, credit card, rewards card, and so on). For example, a pseudo-random number (e.g., debit card number unique to an individual and/or a particular account of the individual) for the card may be generated by the card printing circuit 217. In another example, a design (e.g., color, artwork, templates) for the card may be determined based on a user preference and/or smart table 106 preference. In some embodiments, the card printing circuit 217 is also configured to transmit an instruction to update a card of the customer account to the provider computing system 102, for example, after a new card is printed. The card printing circuit 217 may further be configured to instruct the input/output device 220 of the smart table 106 to print a receipt with card details, such as the limit on the card, the name on the card, an updated card verification value (CVV), an updated PIN, and so on.

The use of the smart table 106 within the smart table system 100 may beneficially reduce significant amounts of time to complete provider interactions during a provider session and/or fill out paperwork forms. Furthermore, the smart tables 106 may help improve transparency of customer account information and employee services and increase face-to-face time with the branch employees. By providing a larger graphical user interface to share customer account information, rather than on a tiny screen on a single user device, the smart tables 106 also increase the amount of inclusion for each party participating in the provider session. The smart tables 106 may additionally help inform customers of several choices and advise the customers by displaying information from the branch employee regarding the customer account information utilizing visual tools. In some embodiments, the visual tools may include pie charts, bar graphs, scatterplots, user graphics, and so on. The smart tables 106 may be configured such that a customer sits while using, or may be configured such that a customer stands while using.

Figure 3:
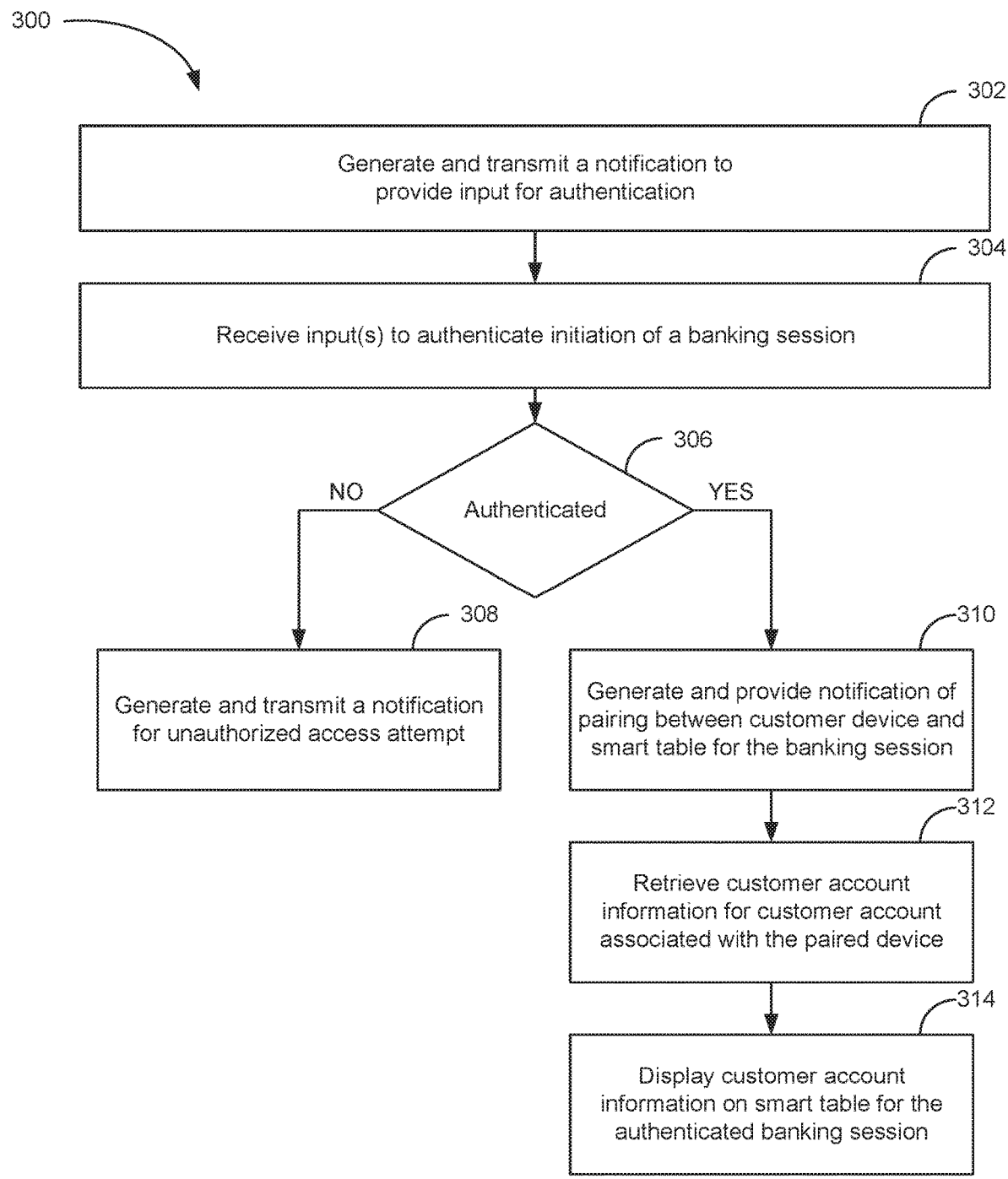
FIG. 3 is a flow diagram of a method for initiating a session with the smart table of FIG. 1, according to example embodiments.

Referring now to FIG. 3, a flow diagram of a method 300 for initiating a session between one or more user devices 104 and a smart table 106 is shown, according to some embodiments. The method 300 may be provided by and/or accessible by the provider client application 120, the branch client application 150, the user client application 132, and the smart table client application 218, for example. The method 300 may be performed by the smart table system 100 described above pertaining to FIGS. 1 and 2. In some embodiments, the method 300 begins in response to receiving, by a smart table 106, a session trigger event. A session trigger event may be any event that triggers the beginning of a session between the smart table 106 and a user device 104. For example, when a customer is within a certain proximity of the smart table 106, the user device 104 associated with the customer that the customer is holding may be within a wireless communication range of various devices (e.g., the branch computing system 108 and/or the smart table 106) associated with the branch location. In response to entering the wireless communication range, the respective user device 104 may be configured to automatically request the customer, via the user device 104, to enter confirmation to establish a secure connection with the smart table 106. As such, the security of the provider session may increase, as a customer may be required to be within a certain proximity (e.g., latitude and longitude) of the smart table 106 to begin the provider session. In some embodiments, similarly, a user device 104 of an employee scheduled to be running a provider session for the smart table 106 may also be required to be within proximity of the smart table 106 in order to initiate the provider session. A session trigger event may also include receiving an input via input/output device 220, such as receiving a user interaction via a touch screen display of the smart table 106. In other embodiments, a session trigger event may include a customer or employee logging into a user client application 132 on a user device 104. In additional embodiments, a session trigger event may occur at a specific time, such as in response to the provider session management circuit determining there is a scheduled provider session at a smart table 106 at a specific time. In some embodiments, the smart table 106 may be configured to operate in a low power mode or "sleep mode" until a session trigger event is received.

At 302, the method 300 includes generating and transmitting a notification to a customer device (e.g., a user device 104) to provide an input for authentication. In some embodiments, the notification generation circuit 214 is configured to execute step 302 in response to receiving an instruction from the provider session management circuit 210. The notification generation circuit 214 may be configured to generate a notification requesting user authentication based on information received, via the network 154, from the smart table management circuit 148 and customer account database 118. For example, specific smart tables 106 may require higher levels of authentication before a user may initiate a provider session based on the capabilities of the smart table. Additionally, the customer account database 118 may have stored customer preferences indicating one or more types of input the customer wants to use for authenticating a provider session. Input for authentication may include a personal identification number (PIN), a biometric input (e.g., a fingerprint, a palm print, an eye scan, a voice sample, etc.), a haptic device input (e.g., rings, jewelry, headsets, bands), smart glasses input, an alphanumeric passcode, a barcode, a QR code, a physical key, an electronic key (e.g., a token stored on the user device 104 of the customer), a physical or mobile wallet card (e.g., a credit card with chip technology, a virtual provider card), and so on. In some embodiments, the generated notification may include audible or tactile output when received by the user device 104. For example, in response to receiving the generated notification, the user device 104 may create an audible sound, via the input/output device 134, to catch the attention of the customer and/or an employee working with the customer and/or may cause the user device 104 to vibrate.

In other embodiments, instead of transmitting the notification to a user device 104, the notification requesting an input to authenticate the customer is shown on a display screen of the smart table 106. For example, the notification generation circuit 214 may generate a notification requesting a customer to place a palm on a highlighted area of the display screen of the smart table 106. As another example, the notification generation circuit 214 may provide a notification shown on the display screen of the smart table 106 asking a customer to enter a customer PIN on the customer's user device 104. In some embodiments, the generated notification also includes a message to place the user device 104 associated with the customer on a particular area of the smart table 106. For example, a highlighted area may indicate where to place the user device 104 in order to facilitate using near-field communication data exchange.

The input to authenticate initiation of a provider session is received at step 304. In some embodiments, the authentication circuit 212 is configured to receive the input to authorize initiating the provider session. One or more inputs may be received at step 304, according to some embodiments. For example, in some provider sessions, more than one customer may be detected and/or scheduled to participate in the provider session. As such, the authentication circuit 212 may receive inputs from each customer for the provider session. Additionally, an input to authenticate an employee scheduled to participate in the provider session may also be received at 304. For example, for provider sessions scheduled to conduct transactions with higher security, a branch manager may be required in order to initiate the provider session. As such, authentication inputs may be received from the customer and the branch manager at step 304.

In some embodiments, the inputs are received via the user devices 104 and transmitted to the smart table 106 via the network 154. In other embodiments, the one or more inputs may be received directly by the smart table 106 via the input/output device 220. For example, a PIN for authentication may be entered via a user interface of the customer's user device 104, or a fingerprint may be entered via the input/output device 220 (e.g., a fingerprint scanner) of the smart table 106. Beneficially, a customer may then enter personal authentication information in a more private setting, rather than entering personal authentication information on the smart table 106. As such, the security of the customer's personal information may be improved.

At step 306, the method 300 includes determining whether one or more users are authenticated to initiate the provider session. In some embodiments, the authentication circuit 212 is configured to determine whether authentication for the provider session is successful. The network interface 202 may transmit, via the network 154, the received input to the branch computing system 108 and/or the provider computing system 102. In some embodiments, the provider computing system 102 and/or the branch computing system 108 then determine whether the received input matches user information stored in a database (e.g., in customer account database 118, in employee database 144). For example, the provider computing system 102 determines whether a device token received from the user device 104 matches a token stored in a token vault of the customer account database 118. The network interface 202 may then receive confirmation or a denial of authentication for the one or more users (e.g., a customer, a customer and an employee, more than one customer, etc.). In some embodiments, the authentication circuit 212 is configured to execute step 306 at certain intervals throughout a provider session. For example, after a predetermined time interval, or at the end of a scheduled provider session, the authentication circuit 212 may be configured to re-authenticate the one or more customers and/or employee.

In response to determining one or more of the users were not authenticated, the method 300 proceeds to step 308. The method 300 includes generating and transmitting a notification for an unauthorized access attempt at step 308. In some embodiments, the notification generation circuit 214 is configured to execute the operations at 308. The notification generation circuit 214 may be configured to generate a text notification, an email notification, an automated voiceover notification, and/or any kind of alert to notify a user. The notification generation circuit 214 may be configured to include details concerning the access attempt in the generated notification. For example, the notification may include branch location information (e.g., name, address) and/or a timestamp of when the attempt to initiate a provider session was denied. In some embodiments, the notification also may include contact information for a branch manager and instructions concerning the security of a customer's personal data. For example, the generated notification may include options to view user account details, transaction history, previous provider session history, and so on. The generated notification may also include selectable options to change one or more inputs for authentication (e.g., change a user passcode, change a user PIN, print a new card, etc.) and/or user preferences (e.g., preferences for increased security before access is granted to customer information). In some embodiments, the notification is transmitted to a user device 104 associated with a customer. The notification may also be transmitted, via the network 154, to a user device 104 associated with a branch manager and/or an employee assigned to a scheduled provider session.

On the other hand, if the authentication circuit 212 determines at step 306 that the one or more users are successfully authenticated, the method 300 proceeds to step 310. At step 310, the method 300 includes generating and providing a notification of a successful pairing between customer device (e.g., user device 104) and the smart table 106 for the provider session. In some embodiments, the notification generation circuit 214 is configured to generate a text alert or email alert indicating the establishment of a secure communication session with the smart table 106. The type of generated notification (e.g., email, text, phone call, etc.) may be based on user preferences. For example, the provider session management circuit 210 may receive session preferences for a customer stored in customer account database 118. The provider session preferences may include the kind of notifications the customer wants to receive. The preferences may also include information on where to direct the generated notification. For example, customer preferences may include contact information (e.g., an email of a parent of the customer, a phone number, etc.) to send the generated notification. As such, in some embodiments, the notification may be provided to one or more user devices 104. The generated notification for a successful pairing between the customer user device 104 and the smart table 106 may also be provided via the input/output device 220 of the smart table 106. For example, the smart table 106 may show the notification on a display screen.

At step 312, the method 300 includes retrieving customer account information for the customer account associated with the pair customer user device 104. In some embodiments, the provider session management circuit 210 is configured to execute step 312. The provider session management circuit 210 may be configured to request, via the network interface 202, customer account information from the provider computing system 102. In some embodiments, the amount of customer account information retrieved is relative to the security of the provider session. For example, the customer account information retrieved is relative to the type of input received for user authentication. As an example, if only a passcode was entered, the customer account information that is retrieved may be more limited than if a passcode and a biometric input were entered to authenticate the customer. In some embodiments, customer account information may include previous provider session history, transaction history for the customer account, balances for various accounts (e.g., savings accounts, checking accounts, credit card accounts), loan information, mortgage information, personal information (e.g., name, address, age, education, occupation, salary, etc.), credit card debt, current investments, retirement plans, savings goals, and so on. The provider session management circuit 210 may also be configured to pull specific documents concerning planned transactions for a scheduled provider session at 312. For example, a prepared document regarding a loan may be retrieved at step 312 for a branch employee to review with the customer during the scheduled provider session.

Once the customer account information has been retrieved, at step 314, the customer account information may be displayed on the smart table 106 for the authenticated provider session. In some embodiments, the customer account information may be displayed in a customer area of a display screen of the smart table 106. In other embodiments, the customer account information may be displayed on the customer's user device 104 rather than on a display screen of the smart table 106. For example, for certain customer account information that is more confidential, such as a social security number, and/or customer account information that a customer indicated in preferences should not be shown during a provider session on a smart table, such as a salary or the customer's overall financial worth, the provider session management circuit 210 may be configured to only provide that information on the customer's user device 104. In some embodiments, the customer account information may be displayed using tables, graphics, and/or other visual tools to help convey the data to the customer in a meaningful manner. For example, concerning retirement, a graphic may show a portion of the customer's current earnings that should be set aside for retirement and the progress the customer has made in saving for retirement over a specific period of time.

Figure 4:
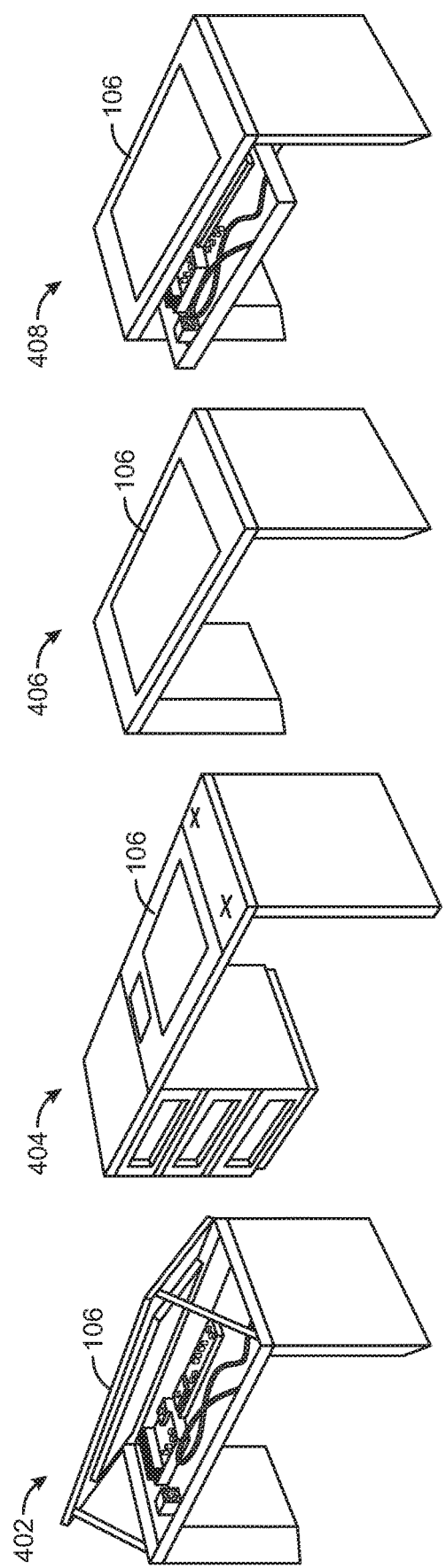
FIG. 4 is an illustration of various configurations of the smart table of FIG. 1, according to example embodiments.

Referring now to FIG. 4, an illustration of various configurations of the smart table 106 are shown, according to some embodiments. A perspective view 402 of a smart table 106 depicts a storage compartment beneath a top surface of the smart table 106. In some embodiments, the cash dispenser of the smart table 106 may be accessed by lifting a top surface of the smart table 106. As such, the cash dispenser may easily be serviced by lifting the top surface of the smart table 106, covering the storage compartment. In other embodiments, a storage compartment of the smart table 106 may be accessed by sliding the top surface to a side of the smart table 106, rather than lifting the top surface. A perspective view 404 of a smart table 106 shows an integration of storage compartments for the smart table 106 and a digitally enabled, touch screen display, according to some embodiments. A perspective view 406 of a smart table 106 depicts a touch screen display encompassing the top surface of the smart table 106. In some embodiments, the smart table 106 may not include a cash dispenser, as shown in perspective view 406. The views shown in FIG. 4 are meant to be illustrative in purpose only, and should not be regarded as limiting in any manner.

Figure 5:
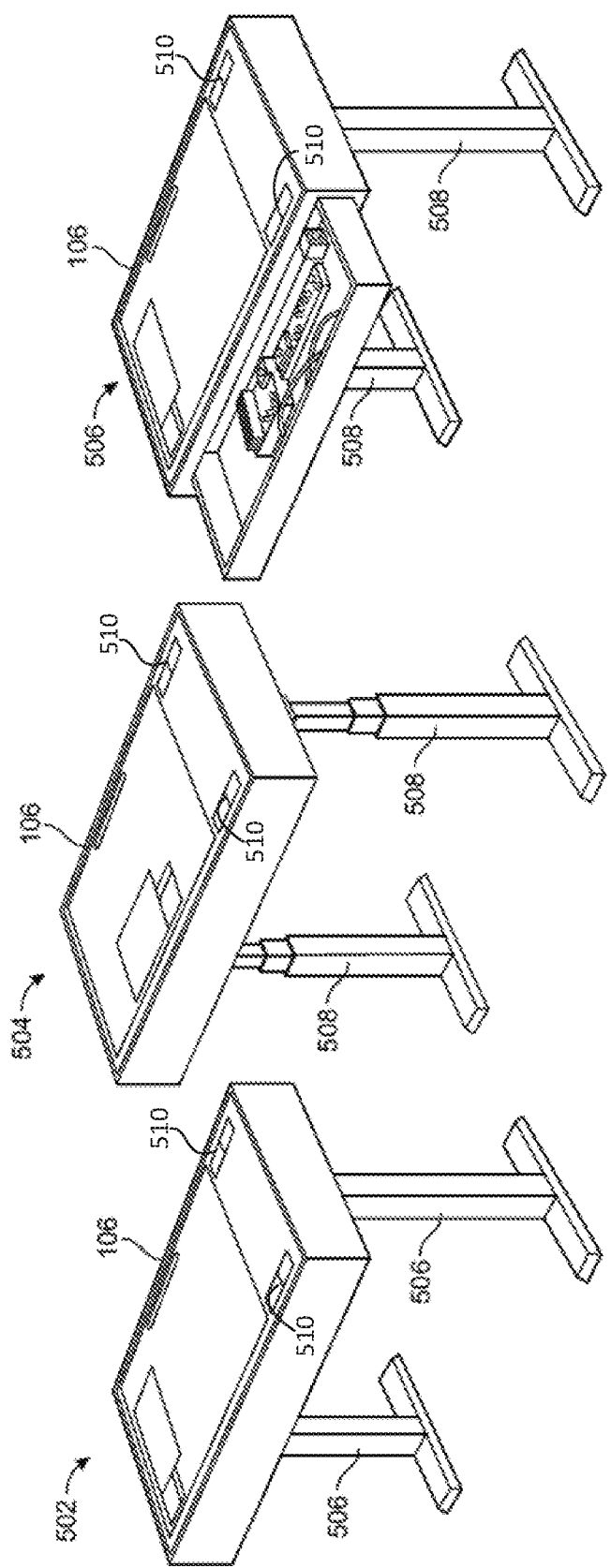
FIG. 5 is an illustration of additional configurations of the smart table of FIG. 1, according to example embodiments.

Referring now to FIG. 5, an illustration of additional configurations of the smart table is shown, according to some embodiments. Perspective view 502 depicts a smart table 106 with a touch screen display and legs 506 at a set height. Perspective view 504 shows a smart table 106 including a touch screen display and legs 508. In some embodiments, the legs 508 may be adjusted to varying heights based on user preference. For example, a user may increase or decrease the height of the smart table 106 by operating motorized lifting columns to increase or decrease the height of the legs 508. In some embodiments, the motorized lifting columns of the legs 508 are activated using a switch on the smart table 106. In other embodiments, the height of the smart table 106 is increased or decreased by entering an input via a touch screen of the smart table 106.

Further, in some the smart table 106 may include one or more device pads 510. The one or more device pads 510 may be configured to receive a user device 104. For example, the smart table 106 may include a sensor (e.g., a weight sensor, an NFC sensor, a light sensor, etc.) configured to detect that a user device 104 is positioned on top of the device pad 510. In certain embodiments, detecting that a user device 104 may be a trigger event (e.g., a session trigger event), such that the smart table 106 may initiate a pairing process with the user device 104 that is positioned on top of the device pad 510. The device pad(s) 510 may positioned on the upper surface of the smart table. Further, the device pad(s) 510 may be configured to charge the user device 104 that is positioned on top of the device pad 510. For example, a wireless charger may be positioned beneath the device pad 510, such that the user device 104 may be charged when positioned on top of the device pad 510.

Figure 6:
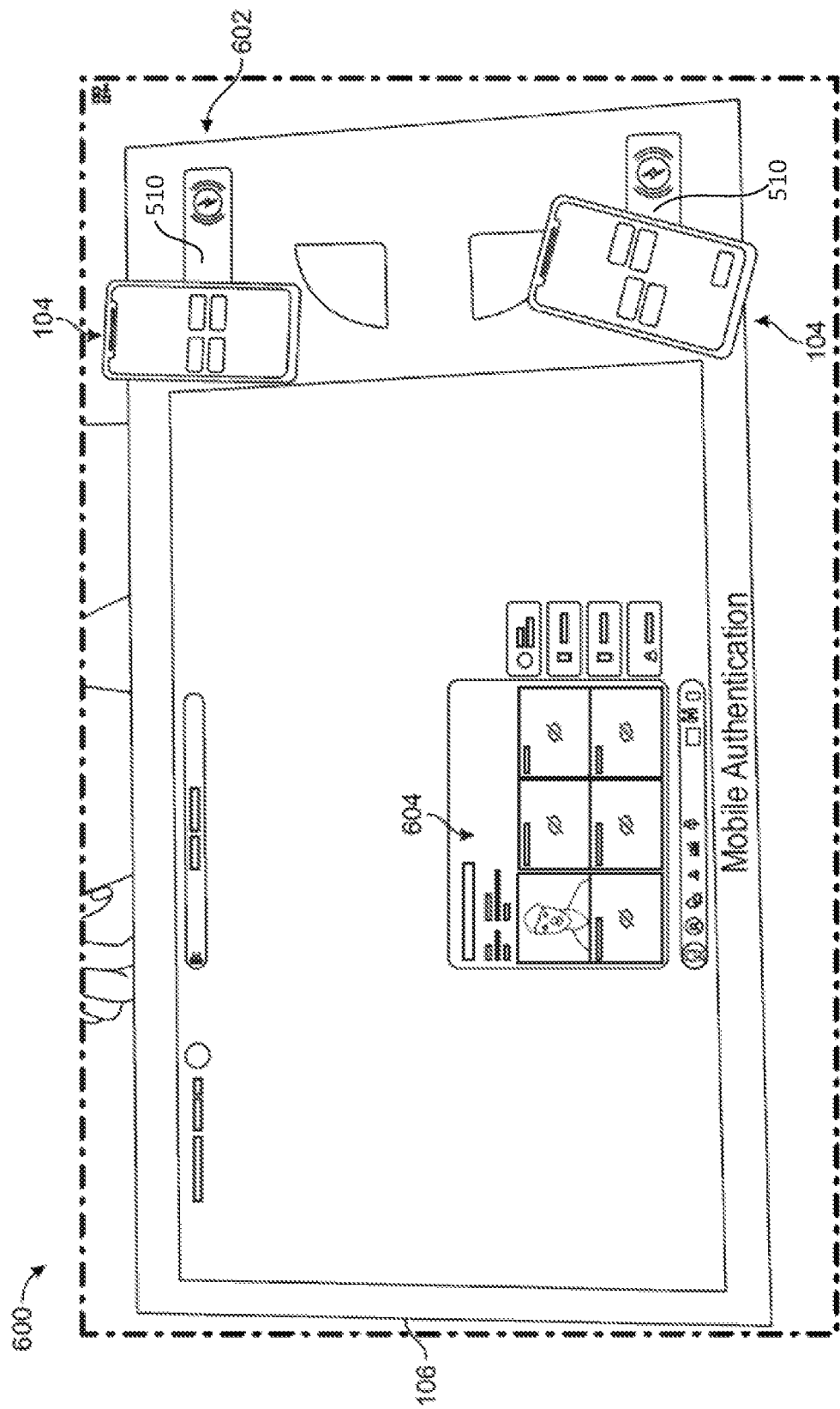
FIG. 6 is an illustration of a user interface of the smart table and paired user devices of FIG. 1, according to example embodiments.

Referring now to FIG. 6, an illustration of a user interface 600 of the smart table 106 and paired user devices 104 is shown, according to some embodiments. The user interface 600 may be provided by the smart table client application 218. In some embodiments, the user interface 600 is generated and displayed, via an input/output device 220, by the provider session management circuit 210. The user interface 600 includes account summary window 604, for example. The account summary window 604 may include a name, address, photo identification, and contact information for a customer. In some embodiments, the account summary window 604 is displayed in response to receiving a selection of a profile icon on the user interface 600. The user interface 600 also includes a device area 602. In some embodiments, the device area 602 includes a charging icon and a wireless connection icon. The connection icon may indicate to one or more users (e.g., a customer, two customers, a customer and an employee, etc.) where to place a user device 104 in order to pair to the smart table 106. As such, the connection icons shown on the user interface 600 may be used as indicators of the locations of NFC tags within the smart table 106. In some embodiments, the user interface 600 may utilize different colors to indicate a successful pairing and an unsuccessful pairing in device area 602. For example, the connection icon may turn green in response to a successful pairing to the respective user device 104 placed over the connection icon. Although FIG. 6 depicts two user devices 104, the smart table 106 may be configured to pair to more than two different user devices 104, according to some embodiments.

Figure 7:
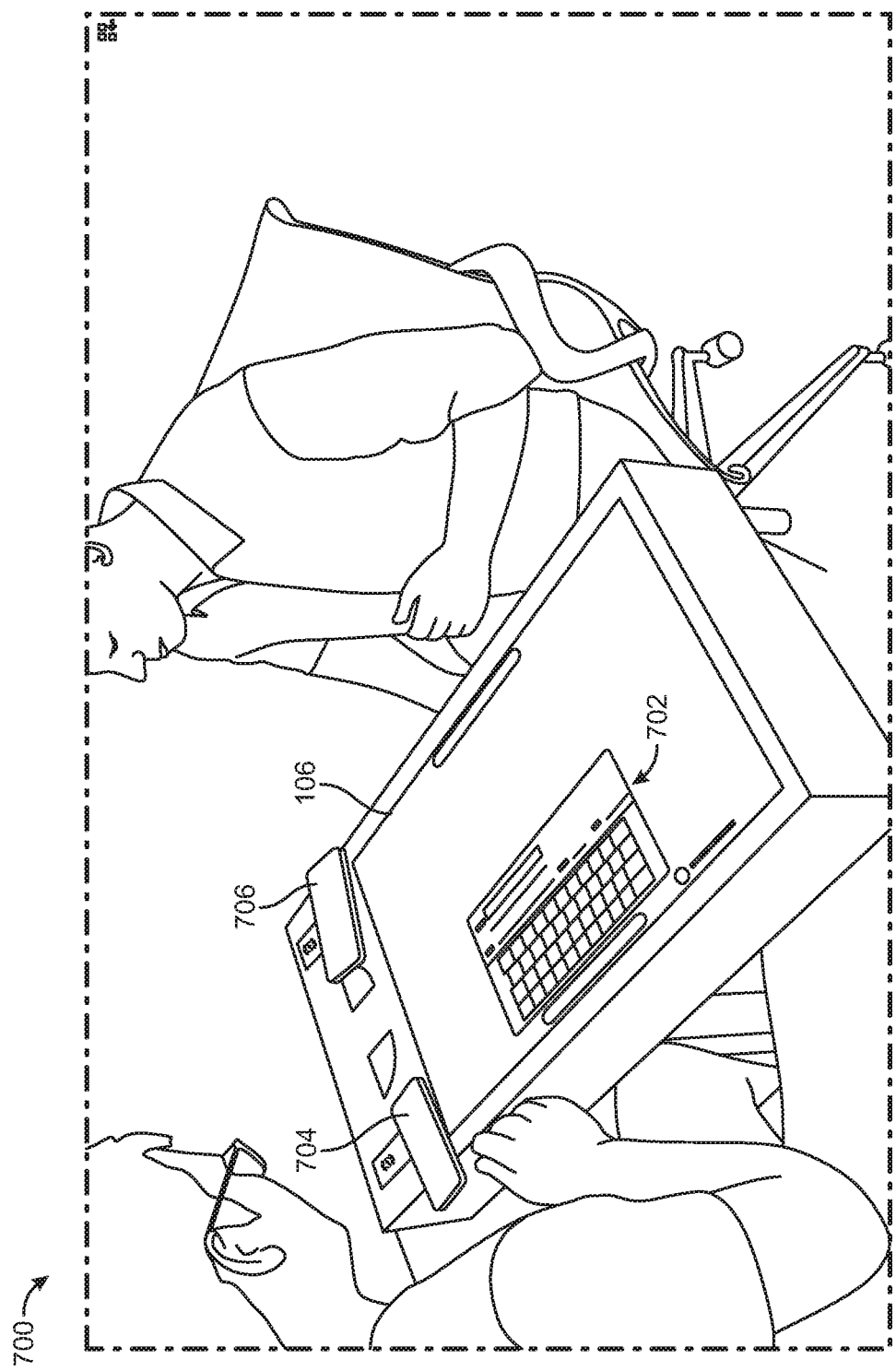
FIG. 7 is an illustration of a user interface of the smart table of FIG. 1 configured to receive an input from a customer or provider representative, according to example embodiments.

Referring now to FIG. 7, an illustration 700 of a user interface of the smart table 106 configured to receive an input from a customer or provider representative is shown, according to some embodiments. The illustration 700 depicts a keyboard 702, a customer device 704, and an employee device 706. The customer device 704 and the employee device 706 may both be the same or similar as the user devices 104 described above. In some embodiments, the keyboard 702 is displayed on a user interface of the smart table 106 to provide an input for the customer. The keyboard 702 may be displayed to enter new information, such as a change of address for the customer. In some embodiments, the keyboard 702 is oriented on a display screen of the smart table 106 based on whether a customer or an employee needs to enter information. For example, the smart table 106 may serve as a desk for a provider employee (e.g., a banker, lawyer, a consultant, a real estate agent). As such, while sitting down at the smart table 106, the customer and the branch employee may be seated on opposite sides of the smart table 106. In some embodiments, the input/output device 220 of the smart table 106 is configured to determine an orientation and position for the keyboard 702 based on data received from sensors and/or cameras of the smart table 106. For example, the sensors and/or cameras of the smart table may determine the position of a person at the smart table 106 and the keyboard 702 may be orientation for that person in response to determining the position of that person.

Figure 8:
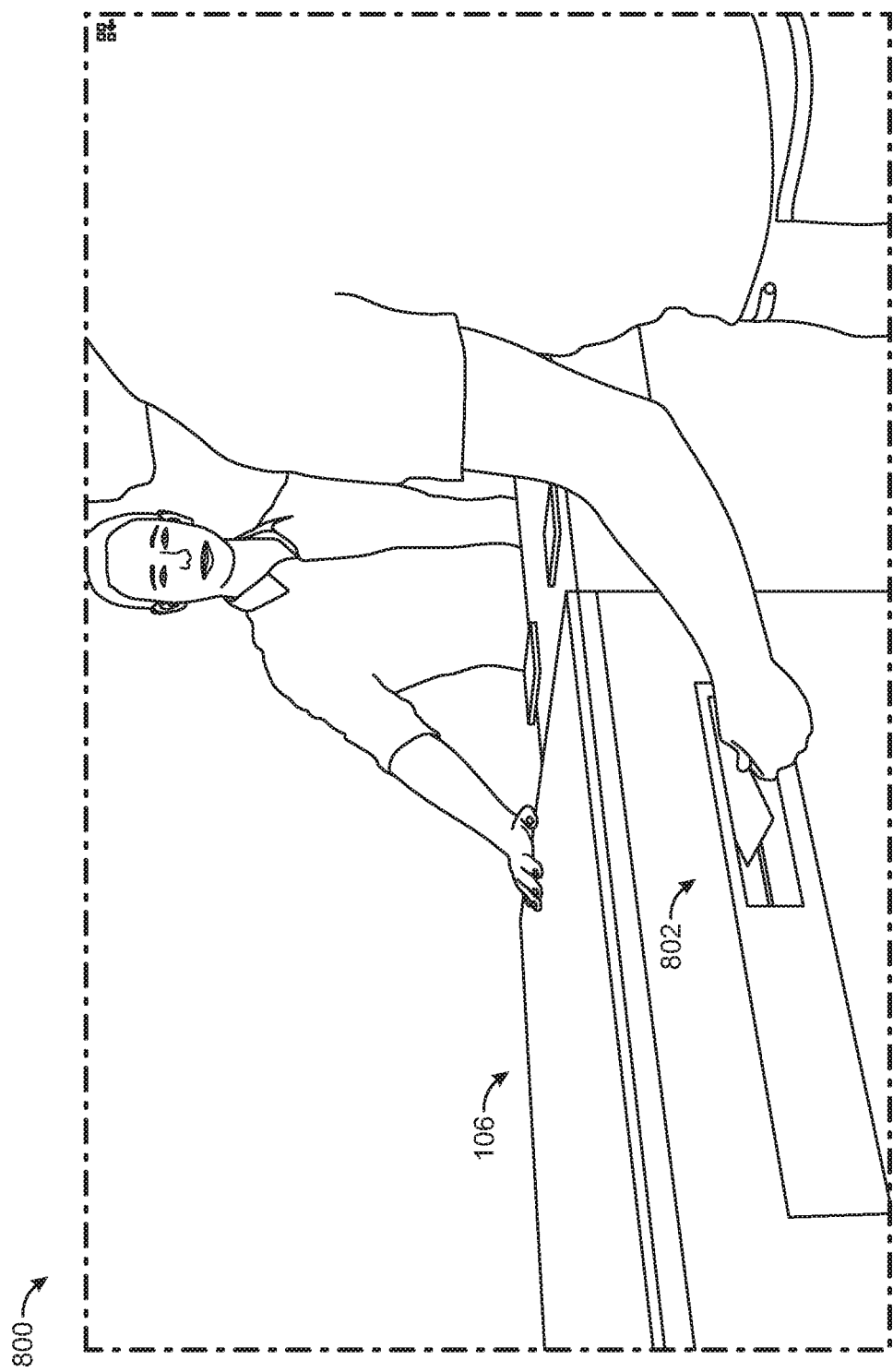
FIG. 8 is an illustration of the smart table of FIG. 1 including a dispensing mechanism, according to example embodiments.

Referring now to FIG. 8, an illustration 800 of the smart table 106 including a dispensing mechanism 802 is shown, according to some embodiments. The dispensing mechanism 802 can be a cash dispenser, though it will be appreciated that the dispensing mechanism 802 can be configured to dispense any type of item, such as cash, a receipt, checks, stamps, and so on. Accordingly, the smart table 106 may beneficially be utilized as an automated teller machine (ATM). In some embodiments, the smart table 106 may be used as an assisted-service ATM, as shown in FIG. 7. The smart table 106 may also function as a station for tellers at a branch location. In other embodiments, the smart table 106 may be used as a self- service ATM, without using employees to supervise the transaction at the smart table 106. The smart table 106 may be configured to pair with the user device 104 of the customer before dispensing cash via the dispensing mechanism 802. For example, the cash dispenser management circuit 216 is configured to receive approval from the authentication circuit 212 before providing cash to a customer using the smart table 106.

Figure 9:
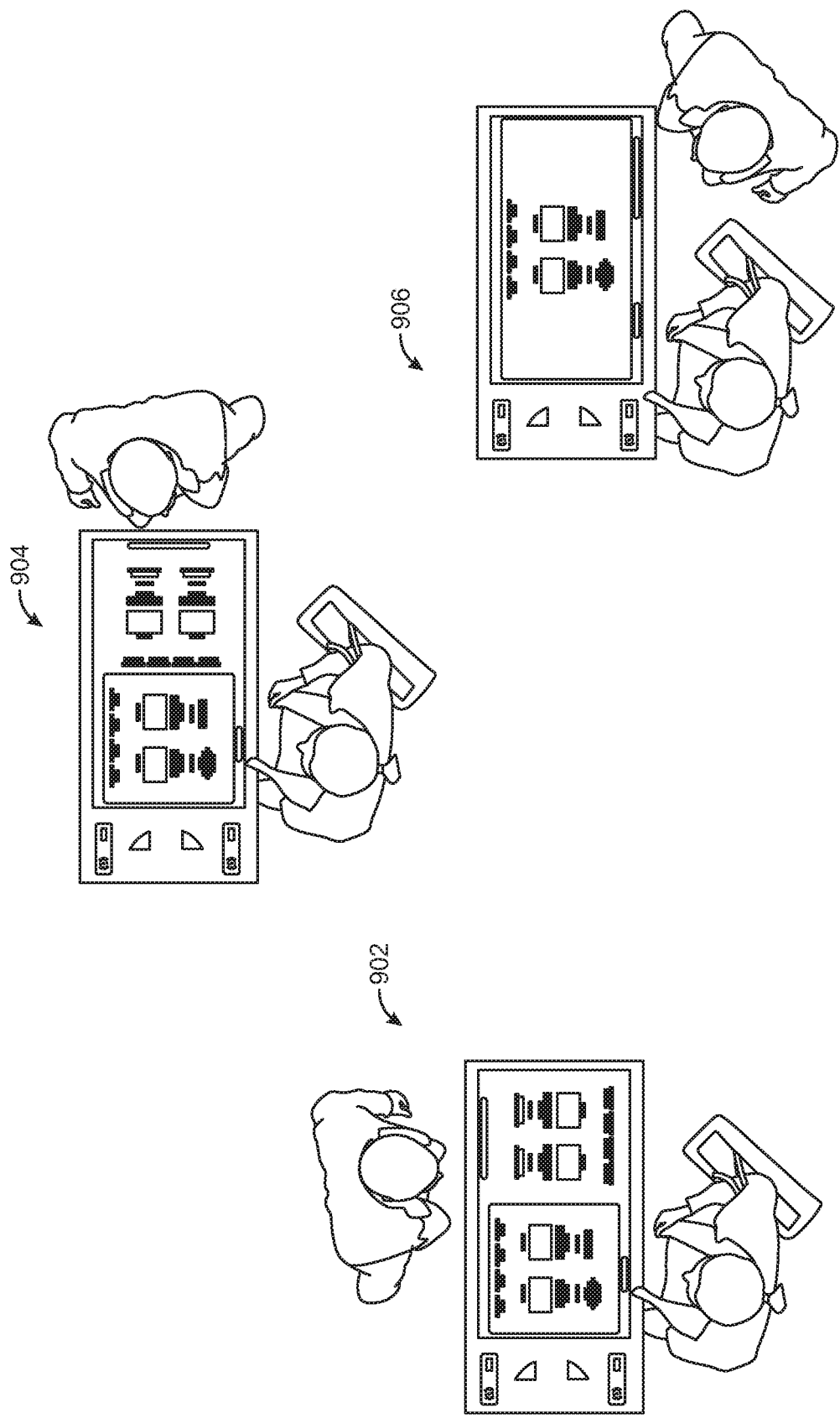
FIG. 9 is an illustration of various user interface orientations displayable by the smart table of FIG. 1, according to example embodiments.

Referring now to FIG. 9, an illustration of various user interface orientations 902 displayable by the smart table 106 is shown, according to some embodiments. A first user interface orientation 902 includes a user interface of a smart table 106 with half of a customer interface area and half of a branch employee interface area. In some embodiments, the branch employee interface area is rotated 180 degrees from the customer interface area in a traditional setting for when the branch employee is on an opposite side of the smart table 106 from the customer. A second user interface orientation 904 includes a user interface of the smart table 106 with the customer interface area and the branch employee interface area rotated 90 degrees from the customer interface area for a more casual setting. A third user interface orientation 906 includes a user interface of the smart table 106 with one interface area for both the customer and the branch employee. In some embodiments, the third user interface orientation 906 shows the customer interface area for when the customer and the branch employee are on the same side of the smart table 106, for example.

Figure 10:
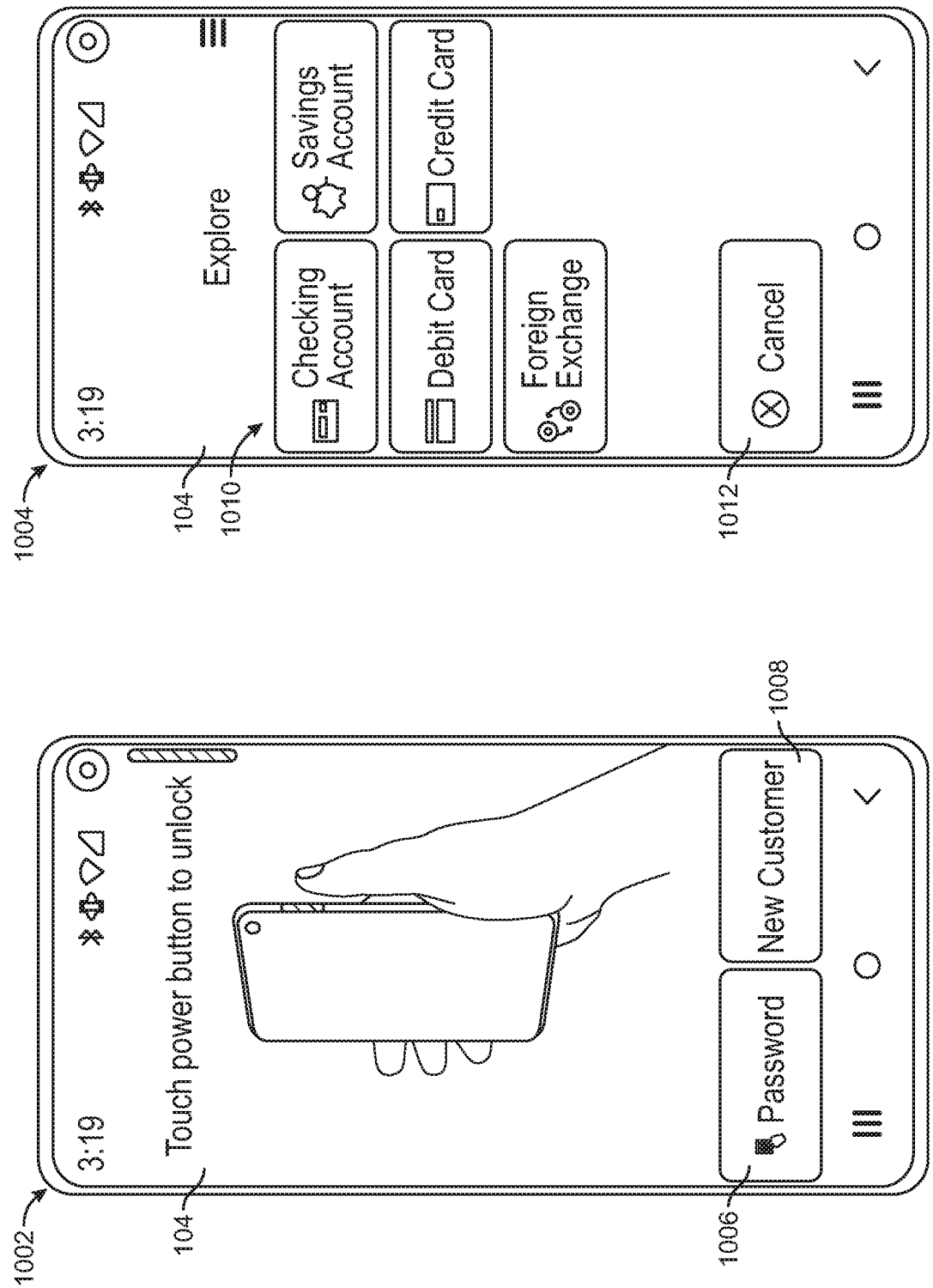
FIG. 10 is an illustration of example user interfaces of the user device of FIG. 1 when the user device is paired to the smart table of FIG. 1, according to example embodiments.

Referring now to FIG. 10, an illustration of example user interfaces of the user device 104 when the user device 104 is paired to the smart table 106 is shown, according to some embodiments. FIG. 10 includes user interface 1002 and user interface 1004. In various embodiments, the user interface 1002 and the user interface 1004 are generated by the smart table system 100 described above with reference to FIG. 1. In some embodiments, the user interface 1002 and the user interface 1004 are generated during the method 300 described above with reference to FIG. 3. The user interface 1002 may be displayed on a user device 104 associated with a customer attempting to pair to a smart table 106, for example. The user interface 1002 may include activatable icons for selecting various options regarding authenticating the customer. In some embodiments, the user interface 1002 includes a password activatable icon 1006 and a new customer activatable icon 1008. In response to receiving a user selection of the password activatable icon 1006, a prompt, generated by the notification generation circuit 214, to enter a password for customer authentication may be displayed. Upon selection of the new customer activatable icon 1008, the notification generation circuit 214 may generate and display a new user interface requesting the user to fill out information to create an account (e.g., a provider account associated with the provider).

The user interface 1004 may be displayed on the user device 104 in response to successful authentication and pairing with the smart table 106. In some embodiments, the user interface 1004 includes activatable icons list 1010 for selecting various options regarding accounts of the customer. For example, the activatable icons list 1010 may include options to view information pertaining to a checking account, a savings account, a debit card, a credit card, and/or foreign exchange. The user interface 1004 may also include a cancel activatable option 1012. In some embodiments, in response to selection of the cancel activatable option 1012, the provider session ends and the established connection between the smart table 106 and the one or more paired user devices 104 ends. In some embodiments, the user device 104 may return to a home page of the user client application 132 in response to receiving a selection of the cancel activatable option 1012.

The terms selectable and activatable are used interchangeably herein. Selectable/activatable icons presented as part of example GUIs may cause a signal to be generated upon selection/activation. The signal may be transmitted to a system, device, or application to indicate to the device, system, or application which icon has been selected, and the device, system, or application may respond accordingly.

Figure 11:
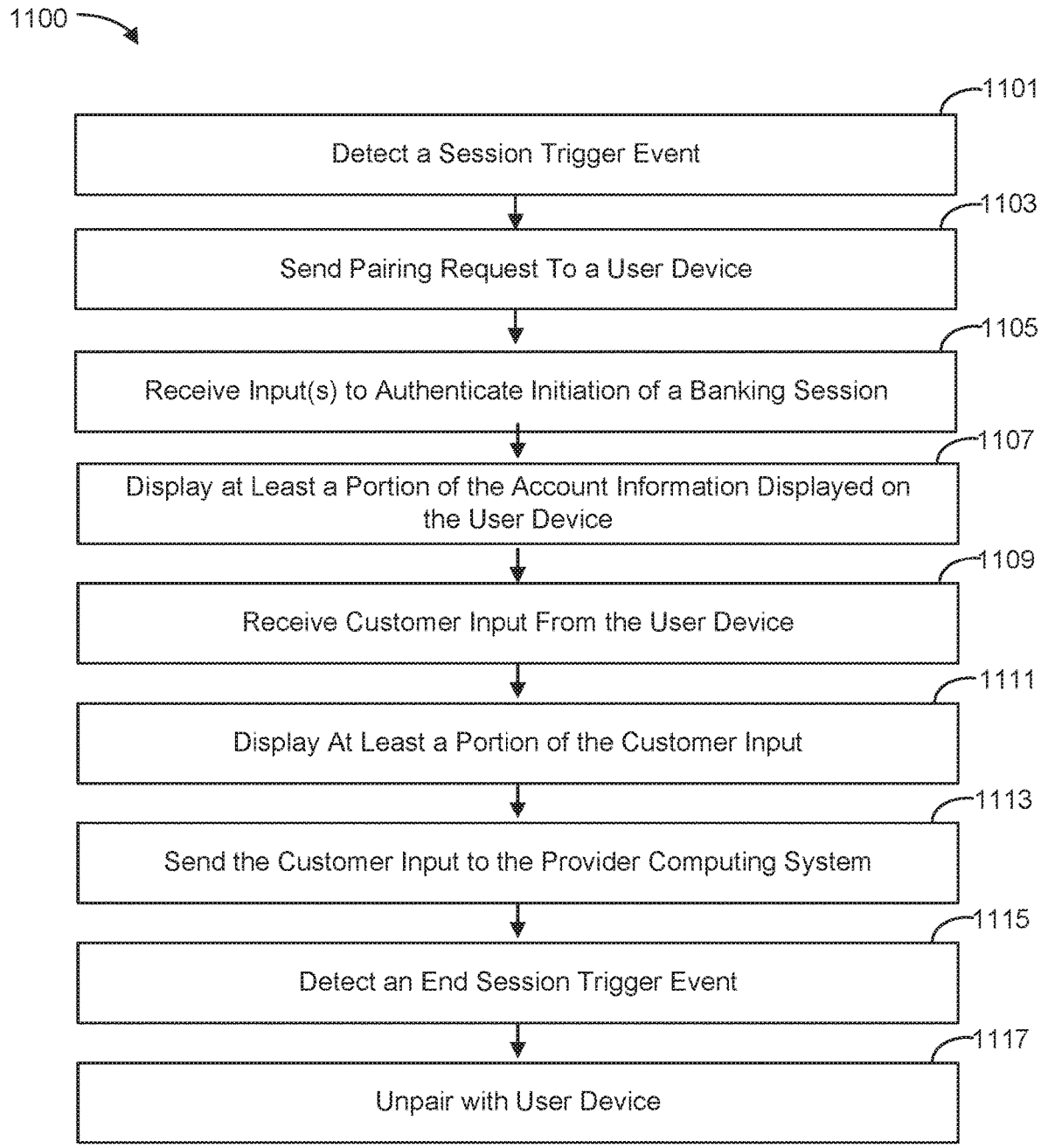
FIG. 11 is a flow diagram of a smart table session process according to an example embodiment.

Referring now to FIG. 11, a flow diagram of a smart table session process 1100 is shown according to an example embodiment. For example, the smart table session process 1100 may be utilized during a transaction with a provider. In certain embodiments, the smart table session process 1100 may be performed by the smart table 106. It should be appreciated that certain steps may be omitted and further steps may be added. Further, the steps need not be performed in the order shown in FIG. 11

Step 1101 includes detecting a session trigger event. The session trigger event may serve to initiate the smart table session process 1100. In certain embodiments, the session trigger event may be detected by the smart table 106. For example, the smart table 106 may include one or more sensor that is configured to detect the session trigger event. In some embodiments, the session trigger event may be detected by the provider computing system 102 and/or the branch computing system 108. In some embodiments, step 1101 may include detecting multiple session trigger events.

In certain embodiments, the session trigger event may include a customer approaching the smart table 106, which may be detected a variety of ways. For example, the smart table 106 may include a camera device that may be configured to detect if a customer is approaching and/or within a predetermined distance of the smart table 106. Alternatively or additionally, the smart table 106 may include any other type of sensor (e.g., a motion sensor, a microphone, a heat sensor, etc.) configured to detect a customer approaching the smart table 106. Further, the branch computing system 108 may include a camera device or other sensor configured to detect a customer. The camera device or other sensor may be located within the same building as the smart table 106, such that camera device or other sensor may detect a customer approaching the smart table 106. Additionally or alternatively, the camera device may be located outside of the building, such that the camera device may detect that the customer is approaching the building that the smart table 106 is located in, which may also serve as a session trigger event.

In certain embodiments, detecting the session trigger event may include detecting audio. For example, the smart table 106 may include a microphone device that is configured to detect sound. In some embodiments, the trigger event may include identifying specific words or phrases using voice recognition software. For example, the session trigger event may include the microphone device detecting the word "welcome" or the phrase "how can I help you" being spoken. In certain embodiments, a pre-defined list of words and phrases may be identified as words that, when detected, may constitute the session trigger event. Additionally or alternatively, machine learning and/or artificial intelligence may be used to develop a list of words or phrases that may serve as the session trigger event. For example, if an agent repeats the same word or phrase at the beginning of the smart table session process 1100, this word or phrase may be added to the list of words or phrases that, when detected, may constitute the session trigger event.

In certain embodiments, detecting the session trigger event may include detecting a user device 104 being within a pre-determined distance of the smart table 106. For example, the smart table 106 may include one or more sensors (e.g., NFC sensor, Bluetooth™ sensor, Wi-Fi™ sensor, etc.) configured to determine that the user device 104 is within a pre-determined distance of the smart table 106. For example, the sensor may be configured to detect a signal being emitted from the user device 104. If the signal (e.g., NFC signal, Bluetooth™ signal, Wi-Fi™ signal, etc.) detected by the sensor is stronger than a pre-determine threshold, the signal may constitute a session trigger event. Additionally or alternatively, the branch computing system 108 may include one or more sensors (e.g., NFC signal, Bluetooth™ signal, Wi-Fi™ signal, etc.) configured to determine that the user device 104 is within a pre-determined distance of the smart table 106. The one or more sensor may be located within the same building as the smart table 106. Additionally, or alternatively, the one or more sensor may be located outside of the building that the smart table 106 is located in, such that the one or more sensor may detect that the customer is approaching the building that the smart table 106 is located in, which may also serve as the session trigger event.

In certain embodiments, detecting the session trigger event may include detecting a user device 104 being within a pre-determined distance of a local branch of the provider. For example, the user device 104 may include a GPS or other location service that is configured to identify the location of the user device 104. The user client application 132 may ping the user device's 104 location and generate a notification when the user device 104 is within the pre-determined distance of the local branch of the provider. The notification may alert the user that there is a nearby local branch. The notification may also request a user input regarding whether the user would like to request a consultation at the local branch. If the user indicates that the user would like to request a consultation on the client application 132, a consultation request notification may be provided to the branch computing system 108 and/or the smart table 106. The consultation request notification serves as a request to have a consultation at a specific local branch, as is discussed further herein. The branch computing system 108 may determine whether a smart table 106 is available and designate an available smart table 106 from a plurality of smart tables 106 to be used for the consultation session. Further, if the user indicates on the client application 132 that the user would like to request a consultation, a map may be surfaced from within the client application 132 that shows the location of the local branch. Further, directions may be provided within the client application 132 that instructs the user how to get to the local branch. In some embodiments, the smart table 106 may provide a pairing request to the user device 104 in response to receiving the consultation request notification. Alternatively, the smart table 106 may send a pairing request to the user device 104 in response to any additional session trigger event(s) being detected, as described herein.

In certain embodiments, the session trigger event may include a consultation request notification being received. In certain embodiments, the consultation request notification may be received by the provider computing system 102, the branch computing system 108, and/or the smart table 106. For example, the consultation request notification may be received from the client application 132 on the user device 104. The consultation request notification serves to schedule a consultation at a local branch. For example, the user may use the client application 132 to send a consultation request notification to schedule a consultation at a local branch. The consultation request notification may include request parameters that define the characteristics of the consultation request. For example, the user may use the client application 132 to select a preferred local branch location, a preferred time of the consultation, a type of consultation, etc., which may be included in the consultation request notification as request parameters. In certain embodiments, if the consultation request notification includes a request parameter that indicates the consultation is to take place at a specified time, the specified time may be the session trigger event. Further, in some embodiments, the smart table 106 may provide a pairing request to the user device 104 in response to receiving the consultation request notification. Alternatively, the smart table 106 may send a pairing request to the user device 104 in response to any additional session trigger event(s) being detected, as described herein.

In certain embodiments, detecting the session trigger event may include detecting a time. For example, a customer may schedule (e.g., by using the user client application 132 to submit a consultation request notification) an in-person consultation with an agent (e.g., an agent of the provider) at a certain time. The scheduled appointment may be stored by the provider computing system 102 and/or the branch computing system 108, such that at the time of the scheduled consultation, or within a pre-determined amount of time of the scheduled consultation, a notification may be sent to the smart table 106. This notification may be detected (i.e., received) by the smart table 106, which may serve as a session trigger event.

Step 1103 includes sending a pairing request to a user device 104. The pairing request may serve to initiate a pairing between the smart table 106 and the user device 104. For example, the smart table 106 may send a pairing request to the user device 104 in response to a session trigger event, or multiple session trigger events, being detected. In certain embodiments, step 1103 may include sending a paring request to multiple user devices 104 (e.g., a first customer device, a second customer device, a provider device, etc.). In certain embodiments, step 1103 may involve generating and transmitting a notification to a customer device (e.g., a user device 104) to provide an input for authentication as described above with respect to FIG. 3 (e.g., step 302).

Step 1105 includes receiving inputs(s) to authenticate initiation of a banking session. For example, input(s) may be received from the user device 104. Step 1105 may be the same or similar to step 304. Further, the some or all steps of method 300 may be performed as a part of step 1105.

Step 1107 includes displaying at least a portion of the account information displayed on the user device 104. Displaying at least a portion of the account information on the user device 104 may serve to facilitate collaboration between the customer operating the user device 104 and an agent that is assisting the customer during the smart table session process 1100. In certain embodiments, the agent may also use a user device 104 (e.g., a provider device). For example, the graphical user interface of the smart table 106 may display at least a portion of the account information being displayed on the display screen of the user device(s) 104. The account information may be stored within the client application 132 of the user device.

In some embodiments, step 1107 includes displaying at least a portion of the account information on the user device 104 includes displaying a mirror image (scaled to size) of a portion of the user device's 104 display on the display of the smart table 106. Alternatively, the information displayed on the user device 104 may be displayed on the smart table 106 in a different style and/or format. For example, the information displayed on the display of the user device 104 (e.g., account number, user's name, user's address, etc.) may be listed in a different order or format. Further, if the user device 104 includes a smaller display than the smart table 106, the user device 104 may only be able to display a limited amount of information at one time and the smart table 106 may be able to display more information. In this embodiment, the smart table 106 may display more information than is displayed on the user device 104.

In some embodiments, certain account information (e.g., secure customer information) may be displayed within the client application 132 on the user device 104 that is not displayed on the smart table 106. For example, if a customer user device 104 is paired to the smart table 106, some confidential or sensitive information (e.g., account number, social security number, address, birthday, income information, etc.) may be displayed within the client application 132 but not displayed on the smart table 106. However, the smart table 106 may display an indication that the information is available on the user device 104. For example, the smart table 106 may display a GUI that includes a button titled "account number" within the display screen. While the customer's account number may not be displayed on the smart table 106, if "account number" is selected on the smart table 106 (e.g., by the customer using the touch screen display), the account number may be displayed on the user device 104 in response to "account number" being selected on the smart table 106.

In some embodiments a first user device 104 (e.g., a customer device) associated with a customer and a second user device 104 (e.g., a provider device) associated with an agent are both paired to the smart table 106. In this example embodiment, certain account information, or other information, may be displayed only on the second user device 104. For example, if the customer is a high risk customer (e.g., significant amounts of outstanding debt, poor credit rating, etc.), a notification may be displayed within the client application 132 of the second user device 104 that identifies the customer as a high risk customer.

Step 1109 includes receiving a customer input, or multiple customer inputs, from the user device 104. For example, the smart table 106 may receive the customer input from client application 132 of the user device 104. Additionally, the smart table 106 may receive the customer input from the input device 172 (e.g., via the customer using the touch screen display to enter a customer input). The customer input(s) serves to begin, continue, and/or complete a transaction as a part of the consultation. For example, the customer input may be used to select the type of transaction (e.g., cash withdrawal, mortgage inquiry, account opening, etc.) to begin, to select a characteristic of the transaction (e.g., how much cash to withdraw, browse available interest rates for the mortgage, select the type of account to open, etc.), and/or to complete the transaction (e.g., complete cash withdrawal request, agree to the terms of the mortgage, complete the account opening, etc.). In certain embodiments, step 1109 may include some or all of the steps of method 300. For example, step 1109 may include step 312, as described above. In certain embodiments, the request parameters included in a consultation request notification may serve as the customer input. For example, if a consultation request notification is submitted on the client application 132 that includes a request parameter that indicates the customer would like to open a checking account, the request parameter may be provided to the smart table 106 as a customer input.

In certain embodiments, the customer input may be input into the client application 132 of the user device 104 prior to a consultation (e.g., the smart table session process 1100). For example, the client application 132 may be launched on the user device any time prior to the consultation. A graphical user interface (GUI) may be generated within the client application 132 that provides the user with a variety of different selections, including various types of transactions. The user may select a type of transaction on the client application 132 and begin the transaction. For example, if the user indicates on the client application 132 that he or she would like to borrow a mortgage loan from the provider, the user may begin to fill in application information (e.g., income information, employment information, asset information, bank statements, etc.) within the client application 132. This information may then be used later (e.g., during the smart table session process 1100) as a part of a transaction. For example, the user may submit a consultation request notification from the client application 132 that includes the application information as request parameters.

Since some or all of the information needed for the transaction may be input into the client application 132 prior to the consultation, less time may be needed during the consultation to collect information needed for the transaction. For example, if a user is waiting for an available smart table 106 and/or an available consultant, the user may begin the transaction on the user device 104 and later complete the transaction on the smart table 106 when a smart table 106 and/or a consultant is available. In another example embodiment, the GUI within the client application 132 may include a help button that, when selected, may send a consultation request notification to the smart table 106, the branch computing system 108, and/or the provider computing system 102. The GUI within the client application 132 may include fields that can be filled by the user with request parameters (e.g., preferred location for the consultation, preferred time of the consultation, etc.) and included in the consultation request notification. Therefore, the smart table session process 1100 enables a user to begin a transaction on the user device 104, schedule a consultation with at a local branch, and complete the transaction on the smart table 106. It should be appreciated that multiple user devices 104, each associated with a different customer (e.g., in the event that a joint account is being inquired about) may be paired to smart table 106, and the customer input may be received from each user device 104 individually. For example, multiple customers associated with the same account (e.g., an account with the provider) may use their individual user devices 104 to independently digitally sign a document that needs to be authorized for the dual account.

In certain embodiments, the customer input may be automatically sent to the smart table 106 upon pairing to the user device 104. For example, at the beginning of the consultation (e.g., the smart table session process 1100) the user device 104 may be paired to the smart table 106 (e.g., method 300). The client application 132 of the user device 104 may include account information associated with user's account, which may be sent to the smart table 106 once the smart table 106 and the user device 104 are paired. Further, if the user begins a transaction on the client application 132 prior to the consultation and enters information into the client application 132 for the transaction as described above, this information may be included in the customer input received at step 1109.

In certain embodiments, the customer input may be entered into the smart table 106 by the user via the input device 172 during the consultation (e.g., the smart table session process 1100). For example, the smart table 106 may launch a GUI on the touch screen display that requests specific information (e.g., name of the user, address of the user, etc.) that is required to complete a transaction (e.g., open an account, take out a loan, etc.) and the user may use the input device 172 to submit a response to the requests for specific information. For example, the user may select a blank field on the touch screen display of the smart table 106, a keyboard may be launched in response on the touch screen display, and the user may use the keyboard to fill in the blank field. Alternatively, a keyboard may be launched on client application 132 of the user device 104, and the customer may use the client application to fill in the blank field. Further, the input device 172 may include a microphone device configured to record the user's voice. Therefore, by implementing voice recognition software, the smart table 106 may receive the customer input verbally from the customer.

In certain embodiments, the customer input may be input into the client application 132 of the user device 104 during the consultation (e.g., the smart table session process 1100). For example, the smart table 106 may launch a GUI that requests specific information is required to complete a transaction. The user may enter a customer input (e.g., a response to the request for specific information requested by the smart table 106) into the client application 132 and the customer input may then be provided to the smart table 106. Therefore, the user device 104 may be used to securely input information into the smart table 106 during the smart table session process 1100. Using the user device 104 to input information during the smart table session process 1100 may provide an added level of security during the transaction. For example, if sensitive or confidential information (i.e., secure customer information) (e.g., social security number, tax information, income, debts, etc.) is required as a part of the transaction, the user may be able to provide this information to the smart table 106 via the client application 132 without having to say the information out loud. This may be particularly beneficial if the smart table session process 1100 is performed in a public place where third parties may be able to overhear sensitive or confidential information.

Further, if the smart table session process 1100 includes an agent of the provider working with the customer at the smart table 106, the agent may have a user device 104 (e.g., a provider device) that is also paired to the smart table 106. The agent's user device 104 may receive (e.g., from the smart table 106) any secure customer information provided by the customer's user device 104 so that the secure customer information does not need to be displayed on the smart table 106 in order for the agent to view this information as a part of the consultation.

Step 1111 includes displaying at least a portion of the customer input. For example, the portion of the customer input may be displayed on the smart table 106. Displaying the portion of the customer input on the smart table serves to enable greater collaboration between the customer and the agent. For example, if the user would like to open a new account, a plurality of account types may be displayed on the screen of the smart table 106 such that the user can select the type of account to open within the client application 132 of the user device 104. Multiple types of accounts, including a description of the type of account, may be displayed concurrently on the screen of the smart table 106. The user then may highlight (i.e., submit a customer input) one or more of the types of accounts on the client application 132. The type of account may then be highlighted on both the smart table 106 and within the client application 132 of the user device 104 (or user devices 104 if the agent also has a user device 104 paired to the smart table 106) thereby enabling the customer and agent to simultaneously view the customer input, along with any other information displayed on the smart table 106 to allow greater collaboration between the agent and the customer. Displaying the portion of the customer input on the smart table 106 may enable the customer and/or agent to view more information than they would be able to view on the user device 104, especially in embodiments when the smart table 106 has a display is larger than the display on the user device 104.

In certain embodiments, if a customer input is received by the smart table 106, some or all of the user devices 104 that are paired to smart table 106 may display at least a portion of the customer input. For example, if a plurality of account types are displayed the customer or agent may use the smart table 106 to enter a customer input (i.e., highlight one of the type of accounts) into the smart table 106. This customer input may then be sent to the user device(s) 104 such that the customer input received by the smart table 106 is displayed within the client application 132 of each user device 104 connected to the smart table 106. For example, if a checking account is highlighted on the smart table 106, then the checking account may be highlighted within the client application 132 of the user device(s) 104. In some embodiments, if a customer input is entered into the smart table 106, the client application 132 may launch various fields to be filled in by the customer and/or agent on the client application 132 of the user device 104. For example, if the customer selects a mortgage loan on the smart table 106 as a part of the customer input, a GUI may be launched within the client application that includes multiple fields (e.g., income information, outstanding debts, etc.) to be completed by the customer on the user device 104. Further, some of the fields may be automatically filled with information stored within the client application 132 or information may be received from the customer account database 118 and automatically filled into the fields.

In certain embodiments, displaying at least a portion of the customer input includes a real-time (or near real-time) two-way screen mirror between the client application 132 and the smart table 106. For example, the user device(s) 104 and the smart table 106 may be communicably coupled to one another such that information may be shared between the two. A GUI may be launched within the client application 132, which then may be mirrored on the display of the smart table 106. Thus, when a selection is made (e.g., selection of a product, scrolling to see more details, zooming in or out, etc.) within the client application 132 of the user device 104, the display of the smart table 106 and any other user devices 104 may identically mirror the selection that is made within the client application 132.

In some embodiments, displaying at least a portion of the customer input includes displaying certain characteristics (e.g., number of characters, first character, last four characters, etc.) of the customer input on the smart table 106. For example, if the customer enters a customer input (e.g., an account number) into the client application 132 of the user device 104, a field titled "account number" on the smart table 106 may be filled in with characteristics of the customer input. For example, the number of characters (e.g., represented as asterisk) included in the customer input may be shown on the smart table 106, the first number of the customer input may be shown on the smart table 106, the last four digits of the customer input may be shown on the smart table 106, or any combination of characteristics of the customer input may be shown on the smart table 106. In doing so, secure customer information may not be displayed on the smart table 106 where unwanted persons may view the information, but the smart table 106 may still show that a customer input is received, thereby facilitating collaboration between the customer and agent. Therefore, in certain embodiments, at least a portion of the secure customer information is not displayed on the smart table 106.

It should be appreciated that the customer input includes inputs made by both the agent and the customer. For example, the agent may use the client application 132 of his or her user device 104 to circle or highlight a piece of information that is relevant to the transaction. The smart table 106 may then receive this customer input and circle or highlight the same piece of information on the display of the smart table 106 to draw special attention to that piece of information.

Step 1113 includes sending the customer input to the provider computing system 102. The customer input may be sent to the provider computing system 102 by the smart table 106 and/or by any of the user devices 104. For example, as a part of the transaction, the customer input, or multiple customer inputs, may be sent to the provider computing system 102 as a transaction request in order to continue or complete the transaction. Sending the customer input (e.g., the transaction request) to the provider computing system 102 serves to complete a transaction (e.g., open a new account on the provider computing system 102). In certain embodiments, options may be sent back to the smart table 106 and/or the user device(s) 104 in response to receiving the customer input. For example, a loan inquiry may be input as a customer input on the client application 132 or the smart table, which may then be sent to the provider computing system 102 as a transaction request. In response to receiving the transaction request, the provider computing system 102 may then send back loan options (e.g., loan amounts, interest rates, payment plans, etc.) that may be displayed on the smart table display 106 and within the client application 132.

Step 1115 includes detecting an end session trigger event. For example, the end session trigger event may be detected by the smart table 106. Alternatively, or additionally, the end session trigger event may be detected by the branch computing system 108 or the provider computing system 102. The end session trigger event serves to indicate that the consultation has been completed.

In some embodiments, detecting the end session trigger event may include the customer using the client application 132 to indicate that the session (e.g., the consultation and/or transaction) has been completed. For example, once a transaction has been completed, a GUI may be displayed within the client application 132 that asks the customer if he or she would like to continue with the consultation (e.g., to complete another transaction). If the customer indicates within the client application 132 that he or she no longer wants to continue with the consultation, an end session notification may be provided to the smart table 106, which may serve as the end session trigger event. The end session trigger event may then be detected (i.e., received) by the smart table 106. Additionally, or alternatively, the end session trigger event may be detected (i.e., received) by the branch computing system 108, the provider computing system 102, or the user device 104 (e.g., the user device 104 operated by an agent of the provider).

In certain embodiments, detecting the end session trigger event may include detecting audio. For example, the smart table 106 may include a microphone device that is configured to detect sound. In some embodiments, detecting the end session trigger event may include detecting specific words or phrases. For example, the session trigger event may include the microphone device detecting the word "thank you for coming in today" and/or the phrase "your transaction has been completed" being spoken. In certain embodiments, a pre-defined list of words and phrases may serve as the end session trigger event. Additionally, or alternatively, machine learning and/or artificial intelligence may be used to develop a list of words or phrases that may serve as the end session trigger event. For example, if an agent and/or customer repeats the same word or phrase at the end of each transaction, this word or phrase may be added to the list of words or phrases that serve as the end session trigger event.

In certain embodiments, detecting the end session trigger event may include detecting the user device 104 being located further than a pre-determined distance of the smart table 106. The smart table 106 may include sensors (e.g., NFC sensor, Bluetooth™ sensor, Wi-Fi™ sensor, etc.) configured to determine how far the user device 104 is from the smart table 106. For example, once the user device 104 is paired with the smart table 106, a signal strength between the user device 104 and smart table 106 may be monitored. If the user device 104 is further than the pre-determined distance from the smart table, the connection strength may fall below a pre-determined threshold, which may serve as the unpairing event. In certain embodiments, the smart table 106 may include a sensor (e.g., a weight sensor, an NFC sensor, a light sensor, etc.) configured to detect that the user device 104 is positioned on top of the device pad 510. In this embodiment, removing the user device 104 from the device pad may serve as the end session trigger event. Further, the user device 104 may include a GPS or other location service that is configured to identify the location of the user device 104. The user client application 132 may ping the user device's 104 location and if the user device's 104 location is further than a pre-determined distance of the smart table 106, a notification may be sent to the smart table 106, which may serve as the unpairing event.

In certain embodiments, detecting the end session trigger event may include detecting the customer being located further than a pre-determined distance of the smart table 106. The smart table 106 may include sensors (e.g., motion sensors, camera devices, heat sensors, microphones, etc.) configured to detect when the customer (e.g., the customer associated with the user device 104) is further than a pre-determined distance of the smart table 106. Further, the branch computing system 108 may include sensors (e.g., motion sensors, camera devices, heat sensors, microphones, etc.) configured to detect when the customer is further than a pre-determined distance of the smart table 106.

Step 1117 includes unpairing with the user device(s) 104. For example, the smart table 106 may unpair with the user device(s) 104 in response to an end session trigger event, or multiple end session trigger events, being detected, or multiple end session trigger events being detected. In certain embodiments, once a first end session trigger event is detected, a notification may be sent to the user device 104 asking if the user would like to unpair with the smart table 106. If the user indicates on the client application 132 the user does want to unpair with the smart table 106, the devices may be unpaired. Unpairing the user device(s) 104 from the smart table 106 may further prevent information being shared between one another. For example, the user device(s) 104 may unpair from the smart table 106 once a transaction has been completed. However, if the user device(s) 104 unpair from the smart table 106 before the transaction is completed, the customer may still continue and complete the transaction on client application 132 of the user device 104.

Figure 12:
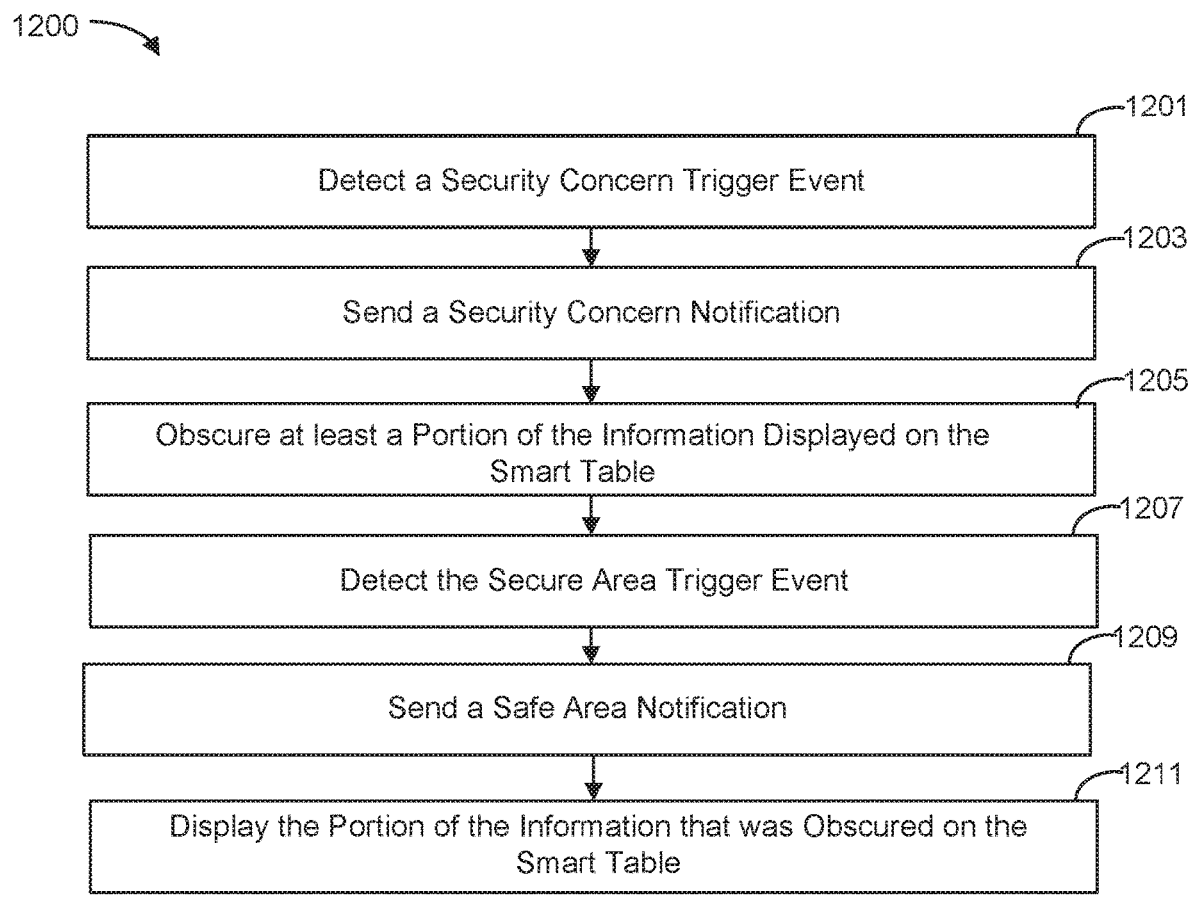
FIG. 12 is a flow diagram of a security concealment process according to an example embodiment.

Referring now to FIG. 12, a security concealment process 1200 is shown according to an example embodiment. The security concealment process 1200 serves to conceal confidential or sensitive information (e.g., secure customer information) from unwanted parties. For example, the smart table 106 may implement the security concealment process 1200 during a consultation (e.g., during the smart table session process 1100). It should be appreciated that certain steps may be omitted and further steps may be added. Further, the steps need not be performed in the order shown in FIG. 12.

Step 1201 includes detecting a security concern trigger event. The security concern trigger event may be detected by the smart table 106 and/or the branch computing system 108. For example, the smart table 106 and/or the branch computing system 108 may include sensors (e.g., motion sensors, camera devices, heat sensors, microphones, NFC sensors, Bluetooth™ sensors, Wi-Fi™ Sensors, etc.) that may detect the security concern trigger event. Detecting the security concern trigger event serves to identify a situation in which an unwanted third party may be capable of hearing or seeing information being discussed or displayed during the consultation.

In certain embodiments, detecting the security concern trigger event may include detecting audio. For example, the smart table 106 may include a microphone device that is configured to detect sound. In some embodiments, detecting the security concern trigger event may include detecting the voice of an unwanted party. For example, using voice recognition software, the microphone may detect and identify the voices of the agent and the customer that are participating in the consultation (e.g., during process 1100). The microphone may continue to record sound, and if an additional voice is detected (i.e., not the voice of the agent and the customer that are participating in the consultation), this may serve as the security concern trigger event. In certain embodiments, the additional voice may need to be over a pre-determine threshold (e.g., over 30 dB) to constitute a security concern event.

In certain embodiments, detecting the safety concern trigger event may include detecting an unwanted user device 104 being located closer than a pre-determined distance of the smart table 106. The smart table 106 may include sensors (e.g., NFC sensor, Bluetooth™ sensor, Wi-Fi™ sensor, etc.) configured to determine how far the unwanted user device 104 is from the smart table 106. For example, once the user device(s) 104 is/are paired with the smart table 106 (e.g., at step 1105), sensors of the smart table 106 may continue to monitor for nearby user devices 104. In certain embodiments, when an additional user device 104 is detected, the user device 104 may be authenticated according to step 306. If the additional user device 104 is cannot authenticated (i.e., the unwanted user device 104), and is detected to be closer than a pre-determined distance from the smart table 106, this may serve as the safety concern trigger event.

In certain embodiments, detecting the safety concern trigger event may include detecting an unwanted person being located closer than a pre-determined distance of the smart table 106. The smart table 106 may include sensors (e.g., motion sensors, camera devices, heat sensors, microphones, etc.) configured to detect when an unwanted person (e.g., a person approaching the smart table 106 after the user device(s) 104 are paired to the smart table 106) closer than a pre-determined distance of the smart table 106, which may serve as the safety concern trigger event. Further, the branch computing system 108 may include sensors (e.g., motion sensors, camera devices, heat sensors, microphones, etc.) configured to detect if an unwanted person is closer than a pre-determined distance of the smart table 106.

In some embodiments, detecting the security concern trigger event may include detecting the customer or agent using the client application 132 indicating that there is a security concern. For example, during a consultation, a GUI may be displayed within the client application 132 or on the smart table 106 that asks if there is there is an unwanted person in nearby the smart table 106. If the customer or agent indicates within the client application 132 or on the smart table that there is an unwanted person nearby the smart table 106, this may serve as the security concern trigger event. In some embodiments, the GUI of the client application 132 or smart table 106 may include a button that may be selected by the agent or customer at any time during the consultation. In response, the user device 104 may then send a security concern notification to the smart table 106, as is discussed further below with respect to step 1203. The security concern trigger notification may then be detected (i.e., received) by the smart table 106. Additionally, or alternatively, the security concern trigger notification may be detected (i.e., received) by the branch computing system 108, the provider computing system 102, or the user device 104 (e.g., the user device 104 that did not send the security concern trigger event).

It should be appreciated that multiple levels (e.g., high, medium, and low) of security concern trigger events may be detected. For example, if an unwanted person is detected within a first pre-determined distance of the smart table 106, a low security concern trigger event may be detected. If the unwanted person then gets closer to the smart table 106 such that they are within a second pre-determined distance (i.e., a distance smaller than the first pre-determined distance), a medium security concern trigger event may be detected.

Step 1203 includes sending a security concern notification. For example, the security concern notification may be sent to the smart table 106 and/or the user device 104 in response to the security concern trigger event being detected. The security concern notification serves to alert the smart table 106 and/or user device that a security concern event has been detected. In some embodiments, the security concern notification includes the level of security concern trigger event that was detected (e.g., high, medium, and low). In certain embodiments, if the smart table 106 detects the security concern trigger event, then the smart table 106 may send the security concern notification to the user device 104. If the user device 104 detects the security concern trigger event, then the user device 104 may send the security concern notification to the smart table 106. If the branch computing system 108 detects the security concern notification, then the branch computing system 108 may send the security concern notification to the smart table 106 and the user device 104.

In some embodiments, when the security concern notification is sent or received by the smart table 106, a notification may be displayed within the GUI of the display of the smart table 106. Similarly, if the security concern notification is sent or received by the user device 104, a notification may be displayed within the GUI of the client application 132. The notification may include a message that indicates that a security concern trigger event has been detected. The notification may further cover some or all of the information (e.g., account number, birthday, address, etc.) displayed on the smart table 106 and/or the user device 104. The notification may also prompt a question that asks if the customer would like to (1) proceed, (2) proceed in a safe mode (as will be discussed below with respect to step 1205), or (3) pause the consultation. If the first option is selected, the notification will disappear from the display and the consultation may continue as normal. If the second option is selected, the user device 104 and/or smart table 106 may enter safe mode, as is discussed further below. If the third option is selected, all of the information on the screen may be covered until an input is received to continue the consultation. It should be appreciated that in some embodiments, the smart table 106 and/or user device 104 may go into safe mode in response to a security concern trigger event being detected without displaying a notification on the smart table 106 or user device 104.

Step 1205 includes obscuring (e.g., blacking out, blurring, pixelating, highlighting, blanking, redacting a word, or otherwise hiding) at least a portion of the information displayed on the smart table 106. For example, the smart table 106 may enter safe mode. When the smart table 106 is in safe mode, at least a portion of the information displayed on the smart table is obscured or concealed. For example, the smart table 106 may enter safe mode in response to a security concern trigger event being detected. Safe mode serves to obscure information displayed on the smart table 106 when an unwanted person is nearby the smart table 106.

Similarly, the user device 104 may also enter safe mode in response to a security concern trigger event being detected.

In certain embodiments, safe mode may obscure all of the information displayed on the display of the smart table 106. For example, a notification may cover all of the information on the display, the display may be turned off, the display may be blurred or pixilated, etc. such that no information may be viewed on the smart table 106. In other embodiments, only a portion of the information may be obscured in safe mode. For example, only secure or confidential customer information may be obscured while other information is still displayed within the display of the smart table. Further, the amount of information that is obscured may be dynamic. That is, the amount of information being obscured may depend on the severity of the security concern event that was detected. For example, if a low security concern event is detected, only confidential information may be obscured on the smart table 106. However, if a high security concern event is subsequently detected, all of the information may be obscured. In another example, if a low level security concern is detected, the smart table may 106 may enter safe mode. However, if a high security concern event is subsequently detected, both the smart table 106 and the user device(s) 104 may enter safe mode.

It should be appreciated that the smart table 106 may be in safe mode while the user device 104 is not. For example, the smart table 106 may conceal (e.g., blur out, pixilate, black out, cover, etc.) a portion of the information while the portion of information is still displayed within the client application 132 of the user device 104. This enables the customer and/or agent to continue the transaction while the smart table 106 is in smart mode.

Step 1207 includes detecting a secure area trigger event. The safe area trigger event may be detected by the smart table 106 and/or the branch computing system 108. For example, the smart table 106 and/or the branch computing system 108 may include sensors (e.g., motion sensors, camera devices, heat sensors, microphones, NFC sensors, Bluetooth™ sensors, Wi-Fi™ Sensors, etc.) that may detect the safe area trigger event. Detecting the safe area trigger event serves to identify a situation in which the unwanted third party is no longer capable of hearing or seeing information being discussed or displayed during the consultation.

In certain embodiments, detecting the safe area trigger event may include detecting audio (or lack thereof). For example, the smart table 106 may include a microphone device that is configured to detect sound. In some embodiments, detecting the safe area trigger event may include no longer detecting the voice of an unwanted party. For example, if the security concern trigger event was hearing an unwanted party, using voice recognition software, the microphone may detect and identify when the unwanted party can no longer be heard. In certain embodiments, the additional voice may need to be less than a pre-determine threshold (e.g., less than 10 dB) to constitute a safe area trigger event.

In certain embodiments, detecting the safe area trigger event may include detecting the unwanted user device 104 no longer being located within a pre-determined distance of the smart table 106. The smart table 106 may include sensors (e.g., NFC sensor, Bluetooth™ sensor, Wi-Fi™ sensor, etc.) configured to determine how far the unwanted user device 104 is from the smart table 106. If the security concern trigger event included an unwanted user device 104 within the pre-determined distance of the smart table, then if it is determined that the unwanted user device 104 is no longer within the pre-determined distance of the smart table 106, this may serve as the safe area trigger event.

In certain embodiments, detecting the safe area trigger event may include detecting an unwanted person no longer being located closer than the pre-determined distance of the smart table 106. The smart table 106 may include sensors (e.g., motion sensors, camera devices, heat sensors, microphones, etc.) configured to detect when an unwanted person (e.g., a person approaching the smart table 106 after the user device(s) 104 are paired to the smart table 106) closer than a pre-determined distance of the smart table 106, Further, the branch computing system 108 may include sensors (e.g., motion sensors, camera devices, heat sensors, microphones, etc.) configured to detect if an unwanted person is closer than a pre-determined distance of the smart table 106. If the security concern trigger event is detecting an unwanted person within the pre-determined distance of the smart table 106, then the safe area trigger event may be detecting that the unwanted person is no longer within the pre-determined distance of the smart table 106.

In some embodiments, the safe area trigger event may include the customer or agent using the client application 132 to indicate that there is a safe area. For example, during a consultation, a GUI may be displayed within the client application 132 that asks if there is there is an unwanted person in nearby the smart table 106. If the customer or agent indicates within the client application 132 that there is not an unwanted person nearby the smart table 106, this may serve as the safe area trigger event. For example, if at least a portion of the information displayed on the smart table 106 is hidden, the user and/or agent may indicate on the smart table 106 or on the user device 104 that there is no unwanted person nearby the smart table 106. In some embodiments, the GUI of the client application 132 may include a button that may be selected by the agent or customer at any time during the consultation. In response, the user device 104 may then send a safe area notification to the smart table 106, as is discussed further below with respect to step 1209. The safe area trigger notification may then be detected (i.e., received) by the smart table 106. Additionally, or alternatively, the safe area trigger notification may be detected (i.e., received) by the branch computing system 108, the provider computing system 102, or the user device 104 (e.g., the user device 104 that did not send the safe area trigger event).

It should be appreciated that multiple levels (e.g., high, medium, and low) of safe area trigger events may be detected. For example, if an unwanted person is detected within a first pre-determined distance of the smart table 106, a low safe area trigger event may be detected. If the unwanted person then gets further from the smart table 106 such that they are within a second pre-determined distance (i.e., a distance larger than the first pre-determined distance), a medium safe area trigger event may be detected.

Step 1209 includes sending a safe area notification. For example, the safe area notification may be sent to the smart table 106 and/or the user device 104 in response to the safe area trigger event being detected. The safe area notification serves to alert the smart table 106 and/or user device 104 that there is not an unwanted person nearby the smart table 106. In some embodiments, the safe area notification includes the level of safe area trigger event that was detected (e.g., high, medium, and low). In certain embodiments, if the smart table 106 detects the safe area trigger event, then the smart table 106 may send the safe area notification to the user device 104. If the user device 104 detects the safe area trigger event, then the user device 104 may send the safe area notification to the smart table 106. If the branch computing system 108 detects the safe area notification, then the branch computing system 108 may send the safe area notification to the smart table 106 and the user device 104.

In some embodiments, when the safe area notification is sent or received by the smart table 106, a notification may be displayed within the GUI of the touch screen display of the smart table 106. Similarly, if the safe area notification is sent or received by the user device 104, a notification may be displayed within the GUI of the client application 132. The notification may include a message that indicates that a safe area trigger event has been detected. The notification may further uncover some or all of the information (e.g., account number, birthday, address, etc.) displayed on the smart table 106 and/or the user device 104 that was previously hidden at step 1205. In some embodiments, the notification may prompt a question that asks if the customer would like to (1) proceed, (2) proceed in a safe mode (as will be discussed below with respect to step 1205), or (3) pause the consultation. If the first option is selected, the notification will disappear from the display and the consultation may continue as normal. If the second option is selected, the user device 104 and/or smart table 106 may enter safe mode, as is discussed above. If the third option is selected, all of the information on the screen may be covered until an input is received to continue the consultation. It should be appreciated that in some embodiments, the smart table 106 and/or user device 104 may unhide the portion of the information displayed on the smart table 106 in response to a safe area trigger event being detected without displaying a notification on the smart table 106 or user device 104.

Step 1211 includes displaying the portion of the information displayed on the smart table 106 that was previously obscured. For example, some or all of the portion of the information that was obscured at step 1205 may displayed. Displaying the portion of the information that was previously obscured on the smart table 106 may be done in response to detecting a secure area trigger event and/or receiving a safe area notification. Displaying the portion of the information that was previously obscured on the smart table 106 serves to enable the customer and/or agent to view information that may be used during the transaction.

The amount of information that is displayed at step 1211 may be dynamic. That is, the amount of information that was previously obscured that is now being displayed may depend on the severity of the safe area trigger event that was detected. For example, if a low safe area trigger event is detected, only non-sensitive information may be displayed on the smart table 106. However, if a high safe area trigger event is subsequently detected, all of the information may be displayed. In another example, if a low level security concern is detected, the smart table may 106 may enter safe mode. However, if a high safe area trigger event is subsequently detected, both the smart table 106 and the user device(s) 104 may display more information, such as confidential and secure information.

The embodiments described herein have been described with reference to drawings. The drawings illustrate certain details of specific embodiments that provide the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuitry" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may include or otherwise share the same processor which, in some example embodiments, may execute instructions stored, or otherwise accessed, via different areas of memory).

Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be provided as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Example systems and devices in various embodiments might include a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions include, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure may be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A system comprising:
a smart table communicably coupled to a provider computing system, the smart table comprising:
a table display screen; and
a processing circuit comprising a processor coupled to non-transitory memory, wherein the processing circuit is configured to:
control an image displayed on the table display screen;
pair with a customer device associated with a customer;
pair with a provider device;
mirror at least a portion of the image displayed on the table display screen on a customer display screen of the customer device and on a provider display screen of the provider device;
receive a customer input from the customer device, the customer input comprising sensitive information;
receive a security trigger event;
modify the image displayed on the table display screen to display an indication of the customer input in real-time based on receiving the security trigger event, wherein the indication obscures the sensitive information; and
cause at least a portion of the sensitive information to be displayed on at least one of the customer display screen or the provider display screen.

2. The system of claim 1, wherein the smart table further comprises a sensor configured to detect the security trigger event.

3. The system of claim 2, wherein the sensor comprises a camera configured to detect when a third party is within a predetermined distance of the smart table, wherein the security trigger event is based on the camera detecting that the third party is within the predetermined distance of the smart table.

4. The system of claim 3, wherein the camera is configured to capture images, and the system is further configured to determine the third party is not the customer using facial recognition.

5. The system of claim 1, wherein the processing circuit is further configured to unpair with the customer device based on an end session trigger including the customer device being further than a predetermined distance from the smart table.

6. The system of claim 1, wherein the customer device is a first customer device and the customer is a first customer associated with a customer account, wherein the customer account is a joint account shared by the first customer and a second customer, and wherein the processing circuit is further configured to send a notification to a second customer device associated with the second customer based on pairing with the customer device.

7. The system of claim 1, wherein the processing circuit is further configured to submit a transaction request to the provider computing system based on receiving a transaction request customer input from the customer device.

8. A system comprising:
a smart table communicably coupled to a provider computing system, the smart table comprising:
a display;
a sensor system; and
a processing circuit comprising a processor coupled to non-transitory memory, wherein the processing circuit is configured to:
control an image displayed on the display;
receive sensor data from the sensor system;
pair with a customer device associated with a customer associated with a customer account, the customer device including a screen configured to display a user interface comprising account information associated with the customer account;
mirror at least a portion of the account information displayed on the customer device on the display;
receive sensitive customer information from the customer device;
provide the sensitive customer information to the provider computing system;
receive a security trigger event from the sensor system; and
obscure the sensitive customer information on the display based on receiving the security trigger event.

9. The system of claim 8, wherein the customer is a first customer, the smart table further comprising an orientation sensor configured to detect a position of the first customer and a position of a second customer, wherein:
the smart table comprises a first viewing area and a second viewing area, wherein the first viewing area is orientated in a first direction and the second viewing area is orientated in a second direction that is different than the first direction; and
the processing circuit is further configured to adjust the first direction based on determining the position of the first customer and adjust the second direction based on determining the position of the second customer.

10. The system of claim 8, wherein the smart table further includes a microphone configured to detect one or more voices, wherein the security trigger event is based on the microphone detecting a third party voice.

11. The system of claim 8, wherein the processing circuit is further configured to unpair with the customer device based on determining an end session trigger event being detected by the sensor system, the end session trigger event including the customer device being further than a predetermined distance from the smart table.

12. The system of claim 8, wherein the sensor system includes a near-field communication sensor configured to detect when the customer device is within a predetermined distance of the smart table, wherein the customer device is paired with the processing circuit based on the customer device being within the predetermined distance of the smart table.

13. The system of claim 8, wherein the customer device is a first customer device and the customer is a first customer, wherein the processing circuit is further configured to send an alert to a second customer device associated with the customer account based on pairing with the first customer device, wherein the customer account is a joint account.

14. The system of claim 13, wherein the processing circuit is further configured to receive a sensitive input from the second customer device.

15. The system of claim 8, wherein the processing circuit is further configured to pair with a provider agent device and to receive a sensitive input from the provider agent device.

\* \* \* \* \*